(12) United States Patent
Kindo

(10) Patent No.: US 10,877,482 B2
(45) Date of Patent: Dec. 29, 2020

(54) TRAJECTORY SETTING DEVICE AND TRAJECTORY SETTING METHOD

(71) Applicant: TOYOTA JIDOSHA KABUSHIKI KAISHA, Toyota (JP)

(72) Inventor: Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 15/945,395

(22) Filed: Apr. 4, 2018

(65) Prior Publication Data
US 2018/0292834 A1 Oct. 11, 2018

(30) Foreign Application Priority Data
Apr. 6, 2017 (JP) .................................. 2017-076069

(51) Int. Cl.
*G05D 1/02* (2020.01)
*B60W 30/00* (2006.01)
(Continued)

(52) U.S. Cl.
CPC ........... *G05D 1/0214* (2013.01); *B60W 30/00* (2013.01); *G01C 21/3415* (2013.01);
(Continued)

(58) Field of Classification Search
CPC ............... G05D 1/0214; G05D 1/0088; G05D 2201/0213; G05D 1/0257; G05D 1/0253;
(Continued)

(56) References Cited

U.S. PATENT DOCUMENTS 6,802,037 B2 * 10/2004 Kim ..................... H03M 13/658
375/341
7,065,701 B2 * 6/2006 Kim ..................... G11B 20/1833
714/794
(Continued)

FOREIGN PATENT DOCUMENTS

CN 1189019 A * 7/1998 ........ H03M 13/2948
CN 102446413 A * 5/2012 ............. G08G 1/012
(Continued)

OTHER PUBLICATIONS

Santa Clara University / Scholar Commons Interdisciplinary Design Senior Theses Engineering Senior Theses Jun. 10, 2016 RSL Rover / Patrick Barone, Giovanni Briggs, Aaron Burns, Hesham Naja, Zoe Demertzis (Year: 2016).*
(Continued)

*Primary Examiner* — Behrang Badii
*Assistant Examiner* — Jalal C Coduroglu
(74) *Attorney, Agent, or Firm* — Sughrue Mion, PLLC

(57) ABSTRACT

A trajectory setting device that sets a trajectory of a host vehicle includes a first path generation unit configured to generate a first path by assuming all obstacles around the host vehicle to be stationary obstacles, a second path generation unit configured to generate a second path when the moving obstacle is assumed to move independently, a third path generation unit configured to generate a third path when the moving obstacle is assumed to move while interacting with at least one of the other obstacles or the host vehicle, a reliability calculation unit configured to calculate reliability of the second path and reliability of the third path, and a trajectory setting unit configured to set the trajectory for traveling from the first path, the second path, and the third path based on the reliability of the second path and the reliability of the third path.

11 Claims, 4 Drawing Sheets

(51) Int. Cl.
*G01C 21/34* (2006.01)
*G05D 1/00* (2006.01)
*G01C 21/20* (2006.01)
*G06K 9/00* (2006.01)

(52) U.S. Cl.
CPC .......... *G05D 1/0088* (2013.01); *G01C 21/20* (2013.01); *G05D 1/0253* (2013.01); *G05D 1/0257* (2013.01); *G05D 2201/0213* (2013.01); *G06K 9/00805* (2013.01)

(58) Field of Classification Search
CPC ............................ G05D 1/0217; B60W 30/00; B60W 2550/10; B60W 50/082; B60W 50/14; B60W 50/08; B60W 50/0097; B60W 30/10; G01C 21/3415; G01C 21/20; G06K 9/00805
See application file for complete search history.

(56) References Cited

U.S. PATENT DOCUMENTS

| | | | |
|---|---|---|---|
| 8,473,144 B1 | 6/2013 | Dolgov et al. | |
| 8,605,947 B2* | 12/2013 | Zhang | G08G 1/167 |
| | | | 382/104 |
| 9,511,767 B1 | 12/2016 | Okumura et al. | |
| 10,684,621 B2* | 6/2020 | Matsubara | B60W 30/12 |
| 2003/0142352 A1* | 7/2003 | Matsunaga | G06F 3/1285 |
| | | | 358/1.15 |
| 2004/0230340 A1* | 11/2004 | Fukuchi | G05D 1/0234 |
| | | | 700/245 |
| 2007/0271036 A1* | 11/2007 | Atarashi | G01C 21/32 |
| | | | 701/446 |
| 2009/0024357 A1 | 1/2009 | Aso et al. | |
| 2009/0037088 A1 | 2/2009 | Taguchi | |
| 2010/0010699 A1 | 1/2010 | Taguchi et al. | |
| 2010/0104199 A1* | 4/2010 | Zhang | G08G 1/165 |
| | | | 382/199 |
| 2010/0208075 A1* | 8/2010 | Katsuno | B60Q 9/008 |
| | | | 348/148 |
| 2010/0318240 A1 | 12/2010 | Kindo et al. | |
| 2011/0158163 A1* | 6/2011 | Choudhury | H04W 40/28 |
| | | | 370/328 |
| 2012/0083960 A1 | 4/2012 | Zhu et al. | |
| 2012/0290132 A1* | 11/2012 | Kokubo | B25J 9/1666 |
| | | | 700/255 |
| 2014/0142799 A1 | 5/2014 | Ferguson et al. | |
| 2014/0148989 A1* | 5/2014 | Ueda | G05D 1/02 |
| | | | 701/23 |
| 2014/0222278 A1 | 8/2014 | Fujita | |
| 2016/0221500 A1 | 8/2016 | Sakai et al. | |
| 2016/0231746 A1* | 8/2016 | Hazelton | B60W 30/00 |
| 2016/0280235 A1* | 9/2016 | Sugaiwa | G05D 1/0061 |
| 2016/0280236 A1* | 9/2016 | Otsuka | B60W 50/082 |
| 2017/0008522 A1* | 1/2017 | Sato | B60W 30/095 |
| 2017/0057498 A1* | 3/2017 | Katoh | B60W 10/184 |
| 2017/0129486 A1* | 5/2017 | Nakada | B60W 10/20 |
| 2017/0235310 A1* | 8/2017 | Miyake | B60W 30/188 |
| | | | 701/25 |
| 2018/0074492 A1* | 3/2018 | Yamamoto | B60W 10/20 |
| 2018/0231977 A1* | 8/2018 | Uno | G05D 1/0061 |
| 2018/0292834 A1* | 10/2018 | Kindo | B60W 50/082 |

FOREIGN PATENT DOCUMENTS

| | | | | |
|---|---|---|---|---|
| CN | 202748951 U | * | 2/2013 | |
| CN | 104378180 A | * | 2/2015 | |
| CN | 104506230 A | * | 4/2015 | |
| CN | 105107203 A | * | 12/2015 | ............. G08G 1/012 |
| CN | 204904493 U | * | 12/2015 | |
| CN | 105517028 A | * | 4/2016 | ......... H04L 27/2647 |
| JP | 02191893 A | * | 7/1990 | .......... G05D 1/0251 |
| JP | 11-091397 A | | 4/1999 | |
| JP | 2002-307972 A | | 10/2002 | |
| JP | 2003-228800 A | | 8/2003 | |
| JP | 2007-233765 A | | 9/2007 | |
| JP | 2008-117082 A | | 5/2008 | |
| JP | 2009-037561 A | | 2/2009 | |
| JP | 2009157499 A | | 7/2009 | |
| JP | 2010-287093 A | | 12/2010 | |
| JP | 2012-179929 A | | 9/2012 | |
| WO | WO-2006059403 A1 | * | 6/2006 | ......... H04L 27/2647 |
| WO | 2007/102367 A1 | | 9/2007 | |
| WO | 2013027803 A1 | | 2/2013 | |
| WO | WO-2017000243 A1 | * | 1/2017 | ............. H04L 45/38 |
| WO | WO-2018172849 A1 | * | 9/2018 | .......... G05D 1/0251 |

OTHER PUBLICATIONS

Grounding robot motion in natural language and visual perception Purdue University Purdue e-Pubs Scott Alan Bronkowski (Year: 2016).*

* cited by examiner

TRAJECTORY SETTING DEVICE AND TRAJECTORY SETTING METHOD

INCORPORATION BY REFERENCE

The disclosure of Japanese Patent Application No. 2017-076069 filed on Apr. 6, 2017 including the specification, drawings and abstract is incorporated herein by reference in its entirety.

BACKGROUND

1. Technical Field

The present disclosure relates to a trajectory setting device and a trajectory setting method.

2. Description of Related Art

For example, Japanese Unexamined Patent Application Publication No. 11-91397 (JP 11-91397 A) is known in the related art for a device that performs autonomous driving of a host vehicle. An autonomous traveling vehicle control device disclosed in JP 11-91397 A performs autonomous driving (autonomous traveling) of the host vehicle based on the result of detection of an external environment of the host vehicle.

SUMMARY

In order to perform autonomous driving of a host vehicle, candidates for possible paths of the host vehicle need to be generated using a method that is set in advance in a control device and the like of the host vehicle. A trajectory of the host vehicle for traveling needs to be set from the generated paths by considering traveling efficiency and the like. However, the method set in advance in the control device and the like for generating paths may be inappropriate according to the situation of the host vehicle. In such a case, all paths generated using the method are inappropriate, and the trajectory of the host vehicle for traveling may not be appropriately set from the paths.

In the present technical field, it is desirable to provide a trajectory setting device and a trajectory setting method that can appropriately set a trajectory of a host vehicle for traveling from paths generated using a plurality of different methods.

A first aspect of the present disclosure relates to a trajectory setting device that sets a trajectory of a host vehicle for traveling. The trajectory setting device includes an obstacle recognition unit configured to recognize obstacles around the host vehicle, a first path generation unit configured to generate a first path of the host vehicle by assuming all of the obstacles to be stationary obstacles, a moving obstacle detection unit configured to detect a moving obstacle from the obstacles, a second path generation unit configured to generate a second path of the host vehicle when the moving obstacle is assumed to move independently, a third path generation unit configured to generate a third path of the host vehicle when the moving obstacle is assumed to move while interacting with at least one of the other obstacles or the host vehicle, a reliability calculation unit configured to calculate reliability of the second path and reliability of the third path, and a trajectory setting unit configured to set the trajectory of the host vehicle for traveling from the first path, the second path, and the third path based on the reliability of the second path and the reliability of the third path.

The trajectory setting device according to the first aspect of the present disclosure generates the first path of the host vehicle when all of the obstacles are assumed to be stationary obstacles, generates the second path of the host vehicle when the moving obstacle is assumed to move independently, and generates the third path of the host vehicle when the moving obstacle is assumed to move while interacting with at least one of the other obstacles or the host vehicle. The trajectory setting device calculates the reliability of the second path and the reliability of the third path, and sets the trajectory of the host vehicle for traveling from the first path, the second path, and the third path based on the reliability of the second path and the reliability of the third path. Thus, the trajectory setting device can appropriately set the trajectory of the host vehicle for traveling from paths that are generated using a plurality of different methods.

In the trajectory setting device according to the first aspect of the present disclosure, when the reliability of the third path is higher than or equal to a third reliability threshold, the trajectory setting unit may set the trajectory of the host vehicle for traveling from the third path. When the reliability of the third path is lower than the third reliability threshold, and the reliability of the second path is higher than or equal to a second reliability threshold, the trajectory setting unit may set the trajectory of the host vehicle for traveling from the second path. When the reliability of the third path is lower than the third reliability threshold, and the reliability of the second path is lower than the second reliability threshold, the trajectory setting unit may set the trajectory of the host vehicle for traveling from the first path. The trajectory setting device can employ the trajectory of the host vehicle for traveling in the order of the third path and the second path when reliability is sufficiently high. When the reliability of the second path and the reliability of the third path are not sufficiently high in the trajectory setting device, the trajectory of the host vehicle for traveling is set from the first path. Thus, a situation where the trajectory of the host vehicle for traveling cannot be set due to the insufficient reliability of the second path and the insufficient reliability of the third path is suppressed.

In the trajectory setting device according to the first aspect of the present disclosure, the reliability calculation unit may calculate the reliability of the second path based on reliability of sensing of the host vehicle and reliability of prediction of a candidate path of the moving obstacle when the moving obstacle is assumed to move independently. The trajectory setting device performs the calculation based on the reliability of sensing of the host vehicle acquired from the state and the like of a sensor of the host vehicle, and the reliability of prediction of the candidate path of the moving obstacle when the moving obstacle is assumed to move independently. Thus, the trajectory setting device can acquire the reliability of the second path more appropriately than when the reliability of the second path is calculated from merely one of the reliability of sensing of the host vehicle or the reliability of prediction of the candidate path of the independent moving obstacle.

In the trajectory setting device according to the first aspect of the present disclosure, the reliability calculation unit may calculate the reliability of the third path based on reliability of sensing of the host vehicle and reliability of prediction of a candidate path of the moving obstacle when the moving obstacle is assumed to move while interacting with at least one of the other obstacles or the host vehicle. The trajectory setting device performs the calculation based on the reliability of sensing of the host vehicle acquired from the state and the like of the sensor of the host vehicle, and the reliability of prediction of the candidate path of the moving obstacle when the moving obstacle is assumed to move while interacting with at least one of the other obstacles or the host vehicle. Thus, the trajectory setting device can acquire the reliability of the third path more appropriately than when the reliability of the third path is calculated from merely one of the reliability of sensing of the host vehicle or the reliability of prediction of the candidate path of the interactive moving obstacle.

A second aspect of the present disclosure relates to a trajectory setting device that sets a trajectory of a host vehicle for traveling. The trajectory setting device includes an obstacle recognition unit configured to recognize obstacles around the host vehicle, a moving obstacle detection unit configured to detect a moving obstacle from the obstacles, a second path generation unit configured to generate a second path of the host vehicle when the moving obstacle is assumed to move independently, a third path generation unit configured to generate a third path of the host vehicle when the moving obstacle is assumed to move while interacting with at least one of the other obstacles or the host vehicle, a reliability calculation unit configured to calculate reliability of the second path and reliability of the third path, and a trajectory setting unit configured to set the trajectory of the host vehicle for traveling from the second path and the third path based on the reliability of the second path and the reliability of the third path.

The trajectory setting device according to the second aspect of the present disclosure generates the second path of the host vehicle when the moving obstacle is assumed to move independently, and generates the third path of the host vehicle when the moving obstacle is assumed to move while interacting with at least one of the other obstacles or the host vehicle. The trajectory setting device calculates the reliability of the second path and the reliability of the third path, and sets the trajectory of the host vehicle for traveling from the second path and the third path based on the reliability of the second path and the reliability of the third path. Thus, the trajectory setting device can appropriately set the trajectory of the host vehicle for traveling from paths that are generated using a plurality of different methods.

A third aspect of the present disclosure relates to a trajectory setting method of setting a trajectory of a host vehicle to avoid obstacles. The trajectory setting method includes generating a first path of the host vehicle by assuming all obstacles around the host vehicle to be stationary obstacles, generating a second path of the host vehicle when a moving obstacle detected from the obstacles is assumed to move independently, generating a third path of the host vehicle when the moving obstacle is assumed to move while interacting with at least one of the other obstacles or the host vehicle, calculating reliability of the second path and reliability of the third path, and setting the trajectory of the host vehicle from the first path, the second path, and the third path based on the reliability of the second path and the reliability of the third path.

The trajectory setting method according to the third aspect of the present disclosure generates the first path of the host vehicle when all of the obstacles are assumed to be stationary obstacles, generates the second path of the host vehicle when the moving obstacle is assumed to move independently, and generates the third path of the host vehicle when the moving obstacle is assumed to move while interacting with at least one of the other obstacles or the host vehicle. The trajectory setting method calculates at least the reliability of the second path and the reliability of the third path, and sets the trajectory of the host vehicle for traveling from the first path, the second path, and the third path based on the reliability of the second path and the reliability of the third path. Thus, the trajectory setting method can appropriately set the trajectory of the host vehicle for traveling from paths that are generated using a plurality of different methods.

In the trajectory setting method according to the third aspect of the present disclosure, in the setting of the trajectory, when the reliability of the third path is higher than or equal to a third reliability threshold, the trajectory of the host vehicle for traveling may be set from the third path. In the setting of the trajectory, when the reliability of the third path is lower than the third reliability threshold, and the reliability of the second path is higher than or equal to a second reliability threshold, the trajectory of the host vehicle for traveling may be set from the second path. In the setting of the trajectory, when the reliability of the third path is lower than the third reliability threshold, and the reliability of the second path is lower than the second reliability threshold, the trajectory of the host vehicle for traveling may be set from the first path. The trajectory setting method can employ the trajectory of the host vehicle for traveling in the order of the third path and the second path when reliability is sufficiently high. When the reliability of the second path and the reliability of the third path are not sufficiently high in the trajectory setting device, the trajectory of the host vehicle for traveling is set from the first path. Thus, a situation where the trajectory of the host vehicle for traveling cannot be set due to the insufficient reliability of the second path and the insufficient reliability of the third path is suppressed.

In the trajectory setting method according to the third aspect of the present disclosure, in the calculating of the reliability, the reliability of the second path may be calculated based on reliability of sensing of the host vehicle and reliability of prediction of a candidate path of the moving obstacle when the moving obstacle is assumed to move independently. The trajectory setting method performs the calculation based on the reliability of sensing of the host vehicle acquired from the state and the like of a sensor of the host vehicle, and the reliability of prediction of the candidate path of the moving obstacle when the moving obstacle is assumed to move independently. Thus, the trajectory setting method can acquire the reliability of the second path more appropriately than when the reliability of the second path is calculated from merely one of the reliability of sensing of the host vehicle or the reliability of prediction of the candidate path of the independent moving obstacle.

In the trajectory setting method according to the third aspect of the present disclosure, in the calculating of the reliability, the reliability of the third path may be calculated based on reliability of sensing of the host vehicle and reliability of prediction of a candidate path of the moving obstacle when the moving obstacle is assumed to move while interacting with at least one of the other obstacles or the host vehicle. The trajectory setting method performs the calculation based on the reliability of sensing of the host vehicle acquired from the state and the like of the sensor of the host vehicle, and the reliability of prediction of the candidate path of the moving obstacle when the moving obstacle is assumed to move while interacting with at least one of the other obstacles or the host vehicle. Thus, the trajectory setting method can acquire the reliability of the third path more appropriately than when the reliability of the third path is calculated from merely one of the reliability of sensing of the host vehicle or the reliability of prediction of the candidate path of the interactive moving obstacle.

As described thus far, according to the aspects of the present disclosure, the trajectory of the host vehicle for traveling can be appropriately set from paths that are generated using a plurality of different methods.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to the drawings. A trajectory setting device according to the present embodiment constitutes a part of an autonomous driving system.

Figure 1:
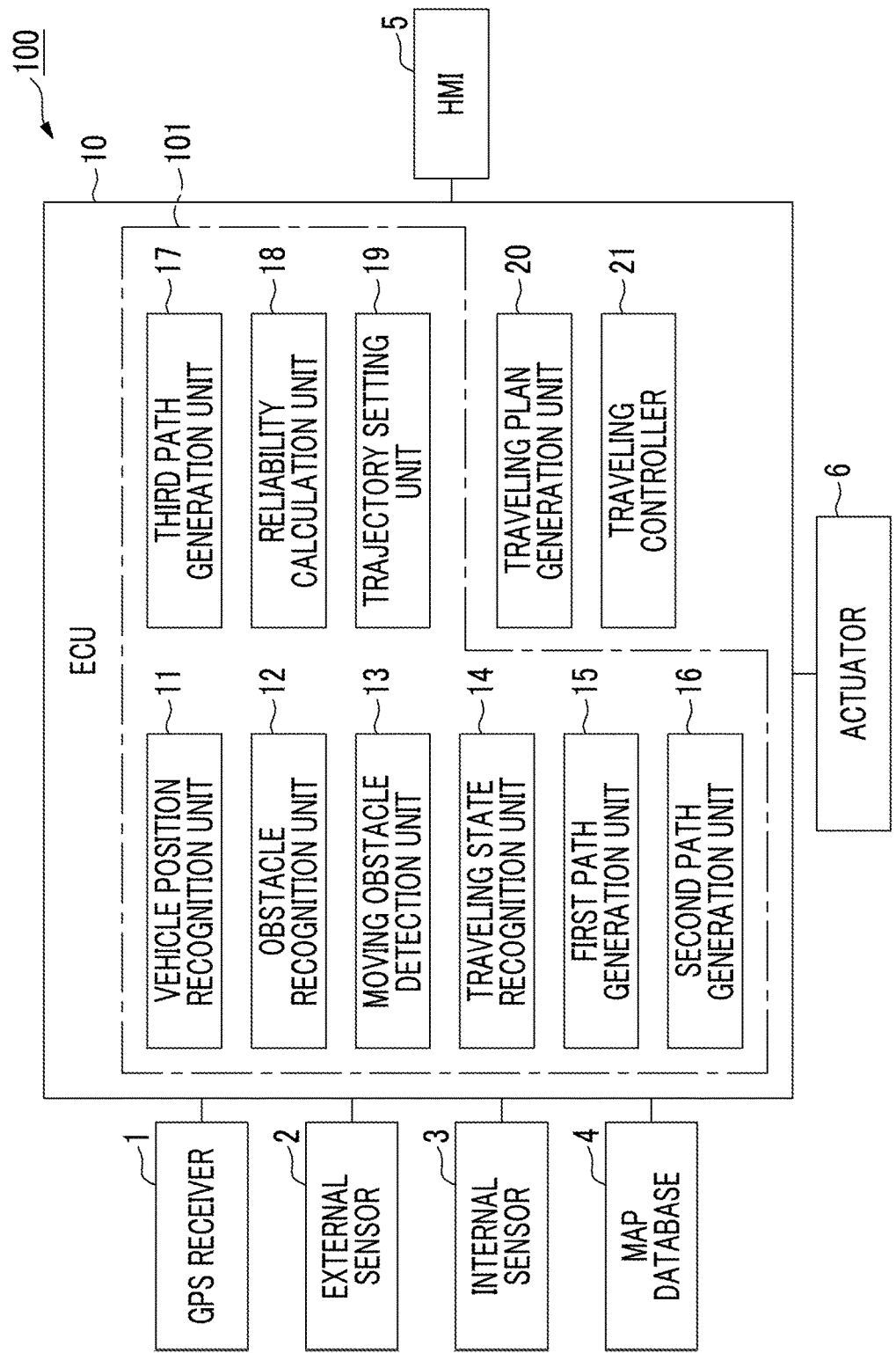
FIG. 1 is a diagram illustrating an autonomous driving system according to the present embodiment.

FIG. 1 is a diagram illustrating the autonomous driving system according to the present embodiment. An autonomous driving system 100 illustrated in FIG. 1 executes autonomous driving of a vehicle such as a passenger car. The autonomous driving is a vehicle control for the vehicle to autonomously travel toward a destination set in advance. The destination may be set by an occupant such as a driver, or may be automatically set by the autonomous driving system 100. In autonomous driving, the vehicle autonomously travels, and the driver does not need to perform a driving operation. Hereinafter, the vehicle that is a target for autonomous driving in the autonomous driving system 100 will be referred to as a host vehicle.

Configuration of Autonomous Driving System

As illustrated in FIG. 1, the autonomous driving system 100 is configured to include a trajectory setting device 101. The trajectory setting device 101 is a device that sets a trajectory of the host vehicle for traveling in autonomous driving and the like.

The autonomous driving system 100 includes an electronic control unit (ECU) 10 that manages the entire system. The ECU 10 is an electronic control unit that includes a central processing unit (CPU), a read-only memory (ROM), a random access memory (RAM), a controller area network (CAN) communication circuit, and the like. For example, the ECU 10 realizes various functions through the CAN communication circuit by loading a program stored in the ROM into the RAM and executing the program loaded into the RAM by the CPU. The ECU 10 may be configured with a plurality of electronic units. The ECU 10 is connected to a GPS receiver 1, an external sensor 2, an internal sensor 3, a map database 4, an HMI 5, and an actuator 6.

The GPS receiver 1 measures the position of the host vehicle (for example, the latitude and the longitude of the host vehicle) by receiving signals from three or more GPS satellites. The GPS receiver 1 transmits the measured position information of the host vehicle to the ECU 10.

The external sensor 2 is a detector that detects a situation around the host vehicle. The external sensor 2 includes at least one of a camera or a radar sensor. The camera is an imaging device that images the external situation of the host vehicle. The camera is disposed behind a windshield of the host vehicle. The camera transmits the imaged information related to the external situation of the host vehicle to the ECU 10. The camera may be a monocular camera or a stereo camera. The stereo camera includes two imaging units that are disposed to reproduce binocular disparity.

The radar sensor is a detector that detects an obstacle around the host vehicle using an electric wave (for example, a millimeter wave) or light. The radar sensor includes a millimeter wave radar or light detection and ranging (LIDAR). The radar sensor transmits an electric wave or light to the area around the host vehicle and detects an obstacle by receiving an electric wave or light reflected by the obstacle. The radar sensor transmits the detected obstacle information to the ECU 10. The radar sensor may include both of a millimeter wave radar and LIDAR.

A traffic signal may be detected by the camera, and an external obstacle may be detected using LIDAR. In such a case, the traffic signal may be detected using template matching based on at least one of color information (for example, brightness) of the image acquired by the camera or the shape of the image (for example, using Hough transform). Map information described below may be used in order to improve the accuracy of detection of the traffic signal.

The internal sensor 3 is a detector that detects the traveling state of the host vehicle. The internal sensor 3 includes a vehicle speed sensor, an acceleration sensor, and a yaw rate sensor. The vehicle speed sensor is a detector that detects the speed of the host vehicle. For example, a wheel speed sensor that is disposed at a wheel of the host vehicle or a driveshaft rotating with the wheel as a single body and detects the rotational speed of the wheel is used as the vehicle speed sensor. The vehicle speed sensor transmits the detected vehicle speed information (wheel speed information) to the ECU 10.

The acceleration sensor is a detector that detects the acceleration of the host vehicle. For example, the acceleration sensor includes a forward and rearward acceleration sensor and a lateral acceleration sensor. The forward and rearward acceleration sensor detects the forward and rearward acceleration of the host vehicle. The lateral acceleration sensor detects the lateral acceleration of the host vehicle. For example, the acceleration sensor transmits the acceleration information of the host vehicle to the ECU 10. The yaw rate sensor is a detector that detects the yaw rate (rotational angular velocity) of the host vehicle about the vertical axis at the center of gravity of the host vehicle. For example, a gyrosensor can be used as the yaw rate sensor. The yaw rate sensor transmits the detected yaw rate information of the host vehicle to the ECU 10.

The map database 4 is a storage device that stores the map information. For example, the map database 4 is formed in a hard disk drive (HDD) that is mounted in the host vehicle. The map information includes Traffic Rule Map. Traffic Rule Map is a map that associates a traffic rule with position information on the map. Traffic Rule Map includes a lane and lane connection information.

The map information can include the output signal of the external sensor 2 in order to use simultaneous localization and mapping (SLAM) technology. That is, the map information includes Localization Knowledge that is used for recognizing the position of the host vehicle. Localization Knowledge is three-dimensional position data that links a feature point to coordinates. Examples of the feature point include a point that exhibits a comparatively high reflectance in the detection result of LIDAR and the like, and a structure (for example, the exterior of a sign, a pole, and a curb) that has a shape showing characteristic edges.

The map information may include Background Knowledge. Background Knowledge is a map that uses voxels to represent a three-dimensional object present as an obstacle (stationary obstacle) which is stationary and does not change in position on the map. The map information may further include Traffic Light Location that is three-dimensional position data of the traffic signal.

The map information may include Surface Knowledge that is surface data related to the level of the surface. The map information may include Trajectory Knowledge. Trajectory Knowledge is data that represents a preferable traveling trajectory defined on the road. Localization Knowledge, Background Knowledge, Traffic Light Location, Surface Knowledge, and Trajectory Knowledge may be stored in a storage device different from the map database 4.

The HMI 5 is an interface for inputting and outputting information between the autonomous driving system 100 and the occupant. For example, the HMI 5 includes a display and a speaker. The HMI 5 outputs an image on the display and outputs audio from the speaker in accordance with a control signal from the ECU 10. The display may be a head-up display. For example, the HMI 5 includes an input device (a button, a touch panel, a voice input device, or the like) for receiving an input from the occupant.

The actuator 6 is a device that is used for controlling the vehicle. The actuator 6 includes at least a throttle actuator, a brake actuator, and a steering actuator. The throttle actuator controls the drive power of the vehicle by controlling the amount of air supplied to an engine (throttle opening degree) in accordance with a control signal from the ECU 10. When the vehicle is a hybrid vehicle, the drive power is controlled by inputting a control signal from the ECU 10 into a motor as a power source in addition to controlling the amount of air supplied to the engine. When the vehicle is an electric vehicle, the drive power is controlled by inputting a control signal from the ECU 10 into a motor as a power source instead of the throttle actuator. In such cases, the motor as a power source constitutes the actuator 6.

The brake actuator controls braking power applied to the wheel of the vehicle by controlling a brake system in accordance with a control signal from the ECU 10. For example, a hydraulic brake system can be used as the brake system. The steering actuator controls, in accordance with a control signal from the ECU 10, driving of an assist motor that controls a steering torque in an electric power steering system. Accordingly, the steering actuator controls the steering torque of the vehicle.

A functional configuration of the ECU 10 will be described. The ECU 10 includes a vehicle position recognition unit 11, an obstacle recognition unit 12, a moving obstacle detection unit 13, a traveling state recognition unit 14, a first path generation unit 15, a second path generation unit 16, a third path generation unit 17, a reliability calculation unit 18, a trajectory setting unit 19, a traveling plan generation unit 20, and a traveling controller 21. A part of the functions of the ECU 10 may be executed in a server that can communicate with the host vehicle.

The vehicle position recognition unit 11 recognizes the position of the host vehicle on the map (host vehicle position estimation: localization) based on the position information of the host vehicle received by the GPS receiver 1 and the map information of the map database 4. Specifically, the vehicle position recognition unit 11 uses Localization Knowledge of the map database 4 and the detection result of the external sensor 2 to recognize the position of the host vehicle using SLAM technology. The vehicle position recognition unit 11 may recognize the position of the host vehicle on the map using a well-known method. When the position of the host vehicle may be measured by a sensor disposed outside the road and the like, the vehicle position recognition unit 11 may recognize the position of the host vehicle by communicating with the sensor.

The obstacle recognition unit 12 recognizes obstacles (including the positions of the obstacles) around the host vehicle based on the detection result of the external sensor 2 and the map information of the map database 4. The obstacle recognition unit 12 detects the obstacles using the distance from the surface when the map information includes Surface Knowledge (surface data). The obstacle recognition unit 12 may detect the obstacles using the distance from the surface by applying an estimated surface model to the detection result of the external sensor 2. The obstacle recognition unit 12 may recognize the obstacles using other well-known methods.

The obstacles include a stationary obstacle such as an electric power pole, a guardrail, a tree, and a building that do not move, and a moving obstacle such as a pedestrian, a bicycle, and other vehicles. For example, the obstacle recognition unit 12 recognizes the obstacles each time the obstacle recognition unit 12 acquires the detection result from the external sensor 2.

The moving obstacle detection unit 13 detects a moving obstacle from the obstacles recognized by the obstacle recognition unit 12. The moving obstacle detection unit 13 detects the moving obstacle from the obstacles using Background Knowledge. The moving obstacle detection unit 13 may detect the moving obstacle using other well-known methods.

The moving obstacle detection unit 13 estimates the movement amount of the moving obstacle at the time of detecting the moving obstacle. The movement amount includes the movement direction and the movement speed of the moving obstacle. The movement amount may include the rotational speed of the moving obstacle. The moving obstacle detection unit 13 may estimate an error in movement amount.

The moving obstacle detection unit 13 may specify the type of moving obstacle using information acquired by the external sensor 2. When the moving obstacle detection unit 13 specifies the type of moving obstacle, the moving obstacle detection unit 13 may correct the movement amount and the error in movement of the moving obstacle based on the type of moving obstacle.

The traveling state recognition unit 14 recognizes the traveling state of the host vehicle based on the detection result of the internal sensor 3 (for example, the vehicle speed information of the vehicle speed sensor, the acceleration information of the acceleration sensor, and the yaw rate information of the yaw rate sensor). For example, the traveling state of the host vehicle includes the vehicle speed, the acceleration, and the yaw rate.

The first path generation unit 15 generates a first path of the host vehicle by assuming all obstacles around the host vehicle to be stationary obstacles. The first path is a stationary obstacle avoidance path that is generated using the method of assuming all obstacles to be stationary obstacles. The first path includes at least one candidate path for causing the host vehicle to travel by avoiding the obstacles. Hereinafter, the assumption that all obstacles are stationary obstacles will be referred to as a stationary obstacle assumption.

The first path generation unit 15 generates the first path based on the detection result of the external sensor 2, the map information of the map database 4, the position of the host vehicle on the map recognized by the vehicle position recognition unit 11, information of the obstacles recognized by the obstacle recognition unit 12, the traveling state of the host vehicle recognized by the traveling state recognition unit 14, and the like. The first path generation unit 15 may generate the first path using other well-known methods.

The second path generation unit 16 generates a second path of the host vehicle when a moving obstacle is assumed to move independently. The independent movement of the moving obstacle means that the moving obstacle moves independently of the presence of other obstacles and the host vehicle. For example, it is assumed that another vehicle that is approaching the host vehicle at a side of the host vehicle does not decelerate for the presence of the host vehicle (does not interact) and maintains its current direction and speed. Hereinafter, the assumption that the moving obstacle moves independently will be referred to as an independent movement assumption.

The second path is an independent moving obstacle avoidance path that is generated using the method of the independent movement assumption. The second path includes at least one candidate path for causing the host vehicle to travel by avoiding the obstacles.

The second path generation unit 16 generates the second path using the independent movement assumption based on the detection result of the external sensor 2, the map information of the map database 4, the position of the host vehicle on the map recognized by the vehicle position recognition unit 11, information of the obstacles recognized by the obstacle recognition unit 12, the traveling state of the host vehicle recognized by the traveling state recognition unit 14, and the like.

Specifically, the second path generation unit 16 predicts a candidate path of the moving obstacle using the independent movement assumption. When the moving obstacle is within a lane, the second path generation unit 16 can predict the candidate path on which the moving obstacle travels along the lane. When there is a branch point in the middle of the lane, the candidate path of the moving obstacle also branches into two or more. The second path generation unit 16 predicts a possible candidate path of the host vehicle using a well-known method. The possible candidate path of the host vehicle is a possible candidate path of the host vehicle in which the influence of the presence of the moving obstacle is not considered. The candidate path that is included in the first path generated by the first path generation unit 15 may be used as the possible candidate path of the host vehicle.

The second path generation unit 16 determines an overlap between the possible candidate path of the moving obstacle and the possible candidate path of the host vehicle under the independent movement assumption. The second path generation unit 16 determines whether or not the candidate path on which the moving obstacle moves independently of the presence of other obstacles and the host vehicle overlaps (intersects) with the possible candidate path of the host vehicle. The second path generation unit 16 generates, as the candidate path of the second path, a candidate path that does not overlap the candidate path of the moving obstacle on the independent movement assumption among the possible candidate paths of the host vehicle.

When there is no candidate path of the host vehicle that does not overlap the candidate path of the moving obstacle on the independent movement assumption, the second path generation unit 16 performs calculation for avoiding collision by adjusting the vehicle speed (speed profile) of the host vehicle. The second path generation unit 16 generates, as the candidate path of the second path, a candidate path of the host vehicle on which collision can be avoided by adjusting the vehicle speed of the host vehicle. The second path generation unit 16 may generate the second path using other well-known methods.

The second path generation unit 16 does not need to consider all obstacles (including the moving obstacle) in generation of the second path. The second path generation unit 16 may generate the second path by considering merely obstacles that have relatively significant influence on generation of the path of the host vehicle. The second path generation unit 16 can generate the second path by considering merely obstacles positioned within a certain distance from the host vehicle based on the point that obstacles positioned in the vicinity of the host vehicle have relatively significant influence on generation of the path of the host vehicle, and that obstacles positioned far from the host vehicle have relatively insignificant (or no) influence on generation of the path of the host vehicle. Such a point also applies to generation of a third path described below.

The third path generation unit 17 generates the third path of the host vehicle when the moving obstacle is assumed to move while interacting with at least one of the other obstacles or the host vehicle. The movement of the moving obstacle while interacting with the other obstacles and the host vehicle means that the moving obstacle moves with deceleration and the like when needed in order to avoid a contact with another obstacle or the host vehicle. The moving obstacle may temporarily stop in order to avoid a contact with another obstacle or the host vehicle. When the candidate path of the moving obstacle branches into a plurality of paths, the candidate paths of the moving obstacle may be narrowed down using the detection result of the external sensor 2. Hereinafter, the assumption that the moving obstacle moves while interacting with at least one of the other obstacles or the host vehicle, or by narrowing down the paths of the moving obstacle will be referred to as an interaction assumption.

The third path is an interacting moving obstacle avoidance path that is generated using the method of the interaction assumption. The third path includes at least one candidate path for causing the host vehicle to travel by avoiding the obstacles.

The third path generation unit 17 generates the third path using the interaction assumption based on the detection result of the external sensor 2, the map information of the map database 4, the position of the host vehicle on the map recognized by the vehicle position recognition unit 11, information of the obstacles recognized by the obstacle recognition unit 12, the traveling state of the host vehicle recognized by the traveling state recognition unit 14, and the like. The third path generation unit 17 generates the third path by considering that the moving obstacle decelerates or temporarily stops due to interaction with at least one of the other obstacles or the host vehicle. In other words, the third path generation unit 17 generates more efficient path of the host vehicle by considering the possibility of removing the influence of the moving obstacle. Generation of the third path using the interaction assumption will be described in detail below.

The reliability calculation unit 18 calculates the reliability of the second path and the reliability of the third path. The reliability of the second path is the result of evaluation of the appropriateness of the second path. The reliability of the third path is the result of evaluation of the appropriateness of the third path. Calculation of the reliability of the second path and the reliability of the third path will be described in detail below.

The trajectory setting unit 19 sets a trajectory of the host vehicle for traveling from the first path, the second path, and the third path based on the reliability of the second path and the reliability of the third path. When the reliability of the third path is higher than or equal to a third reliability threshold, the trajectory setting unit 19 sets the trajectory of the host vehicle for traveling from the third path. The third reliability threshold is a threshold that is set in advance. The trajectory means a path that is finally used for traveling of the host vehicle. The path is a candidate for the trajectory used for setting the trajectory. When the third path includes one candidate path, the trajectory setting unit 19 sets the candidate path as the trajectory of the host vehicle for traveling. For example, when there is a plurality of candidate paths in the third path, the trajectory setting unit 19 sets one candidate path as the trajectory of the host vehicle for traveling from the viewpoint of traveling efficiency. The trajectory setting unit 19 may set a candidate path having the shortest distance to the destination as the trajectory of the host vehicle for traveling, or may set a candidate path having the shortest time period before arrival at the destination as the trajectory of the host vehicle for traveling by considering congestion and the like.

When the reliability of the third path is lower than the third reliability threshold, the trajectory setting unit 19 sets the trajectory of the host vehicle for traveling from the second path when the reliability of the second path is higher than or equal to a second reliability threshold. The second reliability threshold is a threshold that is set in advance. When the second path includes one candidate path, the trajectory setting unit 19 sets the candidate path as the trajectory of the host vehicle for traveling. When there is a plurality of candidate paths in the second path, the trajectory setting unit 19 sets one candidate path as the trajectory of the host vehicle for traveling in the same manner as in the case of the third path.

When the reliability of the third path is lower than the third reliability threshold, and the reliability of the second path is lower than the second reliability threshold, the trajectory setting unit 19 sets the trajectory of the host vehicle for traveling from the first path. When the first path includes one candidate path, the trajectory setting unit 19 sets the candidate path as the trajectory of the host vehicle for traveling. When there is a plurality of candidate paths in the first path, the trajectory setting unit 19 sets one candidate path as the trajectory of the host vehicle for traveling in the same manner as in the case of the third path.

The trajectory setting unit 19 constitutes the trajectory setting device 101 according to the present embodiment. As illustrated in FIG. 1, the vehicle position recognition unit 11, the obstacle recognition unit 12, the moving obstacle detection unit 13, the traveling state recognition unit 14, the first path generation unit 15, the second path generation unit 16, the third path generation unit 17, the reliability calculation unit 18, and the trajectory setting unit 19 in the autonomous driving system 100 constitute the trajectory setting device 101 that sets the trajectory of the host vehicle.

The traveling plan generation unit 20 generates a traveling plan that corresponds to the trajectory set by the trajectory setting unit 19. The traveling plan generation unit 20 generates the traveling plan corresponding to the trajectory of the host vehicle based on at least the detection result of the external sensor 2 and the map information of the map database 4.

Although the traveling plan generation unit 20 is not limited in particular, the traveling plan generation unit 20 preferably outputs the generated traveling plan, that is, the trajectory of the host vehicle, as a plurality of sets, each configured with two elements of a target position p and a speed v at each target point in a coordinate system fixed with respect to the host vehicle. That is, each set is configuration coordinates (p,v). The target position p includes at least the positions of an x coordinate and a y coordinate or information equivalent to the positions of the x coordinate and the y coordinate in the coordinate system fixed with respect to the host vehicle. The traveling plan is not particularly limited, provided that the traveling plan describes the behavior of the host vehicle. For example, the traveling plan may use target time t instead of the speed v, or the target time t and the azimuth of the host vehicle at the time may be added to the traveling plan.

Generally, the traveling plan is simply data that represents a state in the future after a few seconds from the current time. However, data that indicates a state after a few tens of seconds is needed according to situations such as a right turn at an intersection and overtaking of the host vehicle. Thus, although it is not particularly limited, it is preferable that the number of configuration coordinates of the traveling plan be changeable, and that the distance between the configuration coordinates be changeable. A curve that connects the configuration coordinates may be approximated using a spline function and the like, and parameters of the curve may be used as the traveling plan. Generation of the traveling plan can use any well-known method, provided that the traveling plan can describe the behavior of the host vehicle.

The traveling plan may be data that indicates a change in the vehicle speed, the acceleration/deceleration, the steering torque, and the like of the host vehicle when the host vehicle travels the trajectory. The traveling plan may include a speed pattern, an acceleration/deceleration pattern, and a steering pattern of the host vehicle. The traveling plan generation unit 20 may generate the traveling plan that has the shortest trip time period (a needed time period that is needed for the host vehicle to arrive at the destination).

For example, the speed pattern is data configured with a target vehicle speed that is set in association with time per target control position. The target control positions are set on the trajectory at predetermined intervals (for example, 1 m). For example, the acceleration/deceleration pattern is data configured with a target acceleration/deceleration that is set in association with time per target control position. The target control positions are set on the trajectory at predetermined intervals (for example, 1 m). For example, the steering pattern is data configured with a target steering torque that is set in association with time per target control position. The target control positions are set on the trajectory at predetermined intervals (for example, 1 m).

The traveling controller 21 automatically controls traveling of the host vehicle based on the traveling plan generated by the traveling plan generation unit 20. The traveling controller 21 outputs a control signal corresponding to the traveling plan to the actuator 6. Accordingly, the traveling controller 21 controls traveling of the host vehicle such that the host vehicle automatically travels in accordance with the traveling plan. The traveling controller 21 can execute autonomous driving of the host vehicle using a well-known method.

Processes of Autonomous Driving System

Next, processes of the autonomous driving system 100 (processes of the trajectory setting device 101) will be described. First, recognition of the autonomous driving system 100 will be described. It may be desirable to consider interaction with another vehicle in order to increase the accuracy of recognition of the autonomous driving system 100. In other words, recognition and determination are associated with each other. Accordingly, the autonomous driving system 100 performs a plurality of types of determination (planning) according to the type of recognition. That is, the autonomous driving system 100 has several layers of calculation for determination (planning) according to the level of recognition. The layers correspond to the first path, the second path, and the third path.

Trajectory Setting Method

Figure 2:
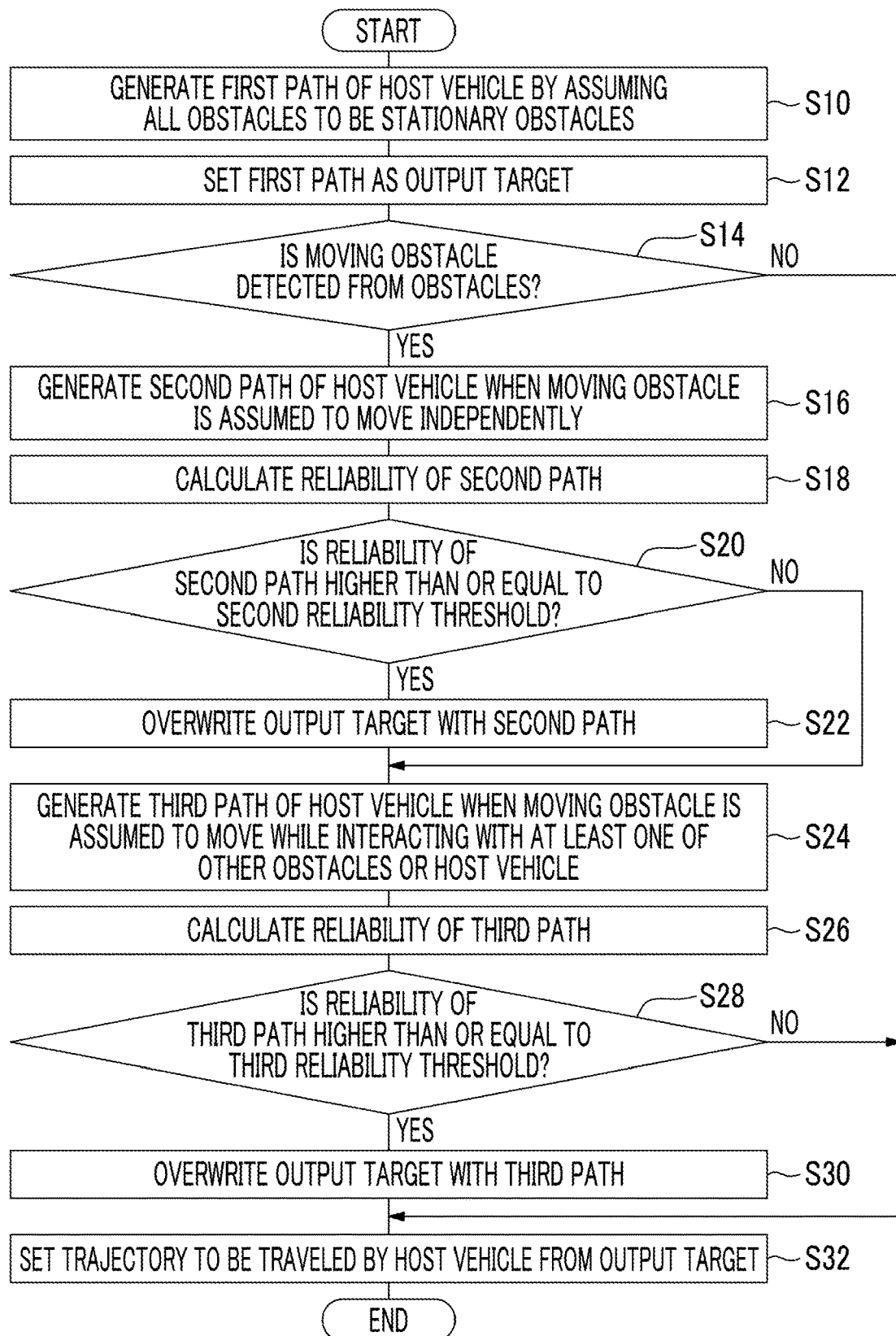
FIG. 2 is a flowchart illustrating a trajectory setting method.

FIG. 2 is a flowchart illustrating a trajectory setting method in the autonomous driving system 100. The process of the flowchart illustrated in FIG. 2 is executed when needed during the autonomous driving control.

As illustrated in FIG. 2, in S10, the ECU 10 of the autonomous driving system 100 uses the first path generation unit 15 to generate the first path of the host vehicle (first path generation step). The first path generation unit 15 generates the first path of the host vehicle when all obstacles around the host vehicle are assumed to be stationary obstacles (stationary obstacle assumption), based on the map information, the position of the host vehicle on the map, information of the obstacles, and the traveling state and the like of the host vehicle.

In S12, the ECU 10 uses the trajectory setting unit 19 to set the first path as an output target.

In S14, the ECU 10 determines whether or not the moving obstacle detection unit 13 detects the moving obstacle from the obstacles (moving obstacle determination step). The moving obstacle detection unit 13 detects the moving obstacle from the obstacles using Background Knowledge. When the ECU 10 determines that the moving obstacle is not detected from the obstacles (S14: NO), the ECU 10 transitions to S32. When the ECU 10 determines that the moving obstacle is detected from the obstacles (S14: YES), the ECU 10 transitions to S16.

In S16, the ECU 10 uses the second path generation unit 16 to generate the second path of the host vehicle (second path generation step). The second path generation unit 16 generates the second path when the moving obstacle is assumed to move independently (independent movement assumption), based on the map information, the position of the host vehicle on the map, information of the obstacles, and the traveling state and the like of the host vehicle.

In S18, the ECU 10 uses the reliability calculation unit 18 to calculate the reliability of the second path (second path reliability calculation step). Calculation of the reliability of the second path will be described in detail below.

In S20, the ECU 10 uses the trajectory setting unit 19 to determine whether or not the reliability of the second path is higher than or equal to the second reliability threshold. When the ECU 10 determines that the reliability of the second path is higher than or equal to the second reliability threshold (S20: YES), the ECU 10 transitions to S22. When the ECU 10 determines that the reliability of the second path is lower than the second reliability threshold (S20: NO), the ECU 10 transitions to S24.

In S22, the ECU 10 uses the trajectory setting unit 19 to overwrite the output target with the second path. That is, the output target is changed to the second path from the first path. Then, the ECU 10 transitions to S24.

In S24, the ECU 10 uses the third path generation unit 17 to generate the third path of the host vehicle (third path generation step). The third path generation unit 17 generates the third path when the moving obstacle is assumed to move while interacting with at least one of the other obstacles or the host vehicle (interaction assumption), based on the map information, the position of the host vehicle on the map, information of the obstacles, and the traveling state and the like of the host vehicle. Generation of the third path will be described in detail below.

In S26, the ECU 10 uses the reliability calculation unit 18 to calculate the reliability of the third path (third path reliability calculation step). Calculation of the reliability of the third path will be described in detail below.

In S28, the ECU 10 uses the trajectory setting unit 19 to determine whether or not the reliability of the third path is higher than or equal to the third reliability threshold. When the ECU 10 determines that the reliability of the third path is higher than or equal to the third reliability threshold (S28: YES), the ECU 10 transitions to S30. When the ECU 10 determines that the reliability of the third path is lower than the third reliability threshold (S28: NO), the ECU 10 transitions to S32.

In S30, the ECU 10 uses the trajectory setting unit 19 to overwrite the output target with the third path. That is, the output target is changed to the third path from the first path or the second path. Then, the ECU 10 transitions to S32.

In S32, the ECU 10 uses the trajectory setting unit 19 to set the trajectory of the host vehicle for traveling from the output target (trajectory setting step). When the output target is the first path, the trajectory setting unit 19 sets one candidate path included in the first path as the trajectory of the host vehicle for traveling. When the output target is the second path, the trajectory setting unit 19 sets one candidate path included in the second path as the trajectory of the host vehicle for traveling.

When the output target is the third path, the trajectory setting unit 19 sets one candidate path included in the third path as the trajectory of the host vehicle for traveling. For example, when there is a plurality of candidate paths, the trajectory setting unit 19 sets the candidate path having the highest traveling efficiency as the trajectory of the host vehicle for traveling. When the trajectory of the host vehicle for traveling is set, the ECU 10 finishes the current process.

That is, determination (the first path, the second path, and the third path) that corresponds to three types of recognition (the stationary obstacle assumption, the independent movement assumption, and the interaction assumption) is calculated. The ECU 10 may omit the process of S14 in the trajectory setting method. In such a case, the process of S16 is started after the process of S12.

Third Path Generation Process

Figure 3:
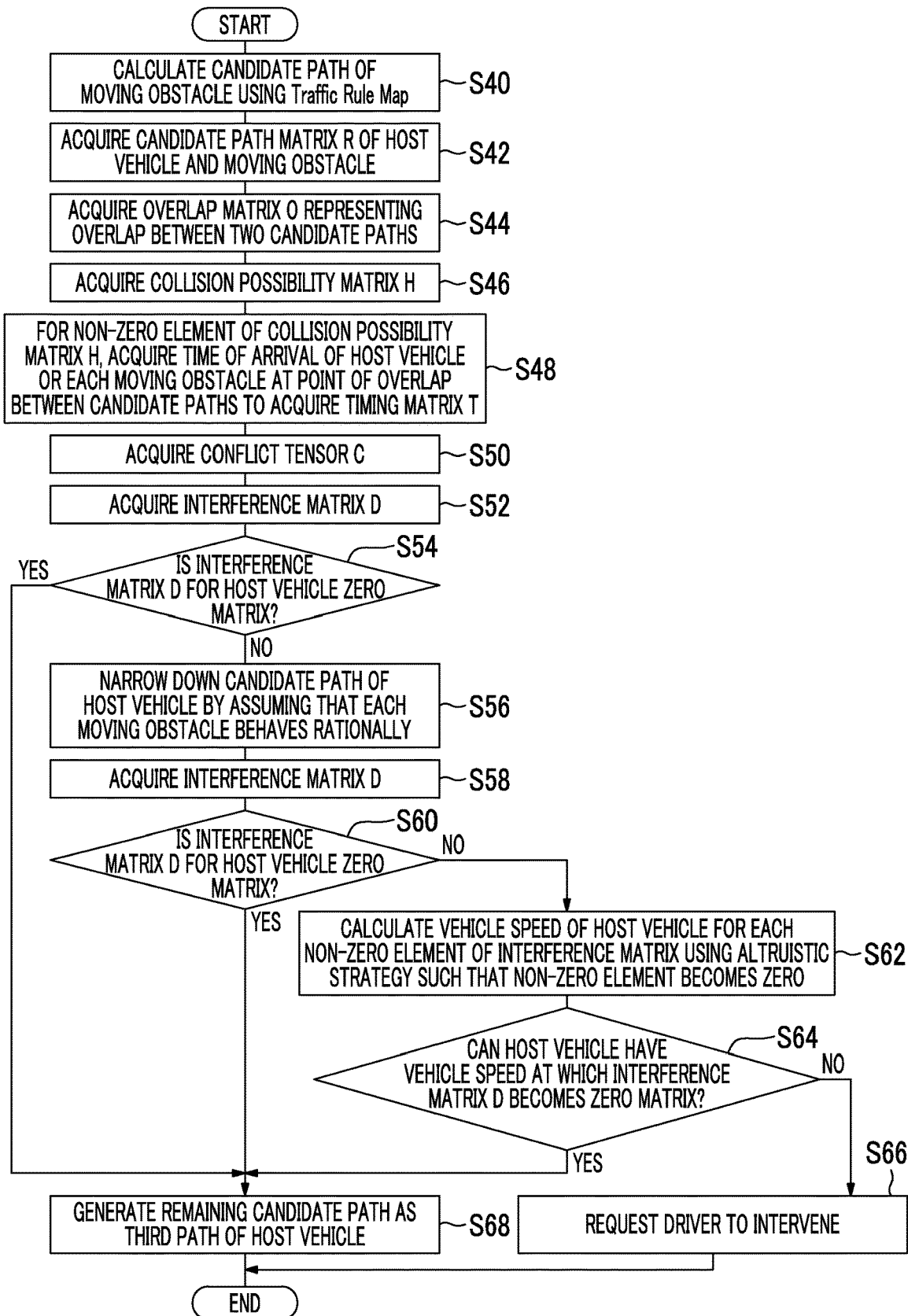
FIG. 3 is a flowchart illustrating a third path generation process.

A third path generation process in the autonomous driving system 100 will be described. FIG. 3 is a flowchart illustrating the third path generation process. The third path generation process corresponds to the process of S26 in FIG. 2.

As illustrated in FIG. 3, in S40, the ECU 10 uses the third path generation unit 17 to calculate the candidate path of the moving obstacle. The third path generation unit 17 calculates the candidate path per moving obstacle (the possible candidate path of the moving obstacle) using the detection result of the moving obstacle detection unit 13 and Traffic Rule Map.

In S42, the ECU 10 uses the third path generation unit 17 to acquire a candidate path matrix R of the host vehicle and the moving obstacle. First, determination/planning of autonomous driving (generation of the traveling plan including trajectory setting) in the autonomous driving system 100 will be described as a premise. Determination/planning of autonomous driving is configured with two processes including dealing with branching of a solution and calculating an appropriate trajectory in selected branch points. The former will be referred to as intention decision, and the latter will be referred to as behavior decision. Considering that a branch point (unusual point) in a situation formed by a non-contact trajectory represents a risk, the intention decision mainly deals with risk avoidance. In the intention decision, making determination is prioritized. The behavior decision is calculation of a trajectory that can establish both of safety and efficiency within a range set by the intention decision. In the behavior decision, deferring determination is prioritized. Deferral of determination will be described below.

The host vehicle and moving obstacles on a road network are denoted by a=1, 2, . . . , and possible candidate paths of a host vehicle a are denoted by α=1, 2, . . . . A possible candidate path matrix of the host vehicle a is denoted by $R_{a\alpha}$. It is considered that each vehicle cannot travel along with each other in a lane. Thus, considering an intention decision problem, a possible candidate path $p_{a\alpha}$ is considered to be a part (or a linked collection) of Trajectory and Navigation Definition File (RNDF) that is a line along the center of the lane. Accordingly, when the host vehicle a is at a point (any center of the lane) $x_a$ on the road, a line that branches along the center of the road in front of the host vehicle a is a candidate path.

By assigning 1 to a case where the host vehicle a has a possibility of taking the candidate path, and 0 to a case where the host vehicle a does not have a possibility of taking the candidate path, each element $R_{a\alpha}$ of the possible candidate path matrix of the host vehicle a can be represented using General Formula (1).

$$R_{a\alpha} = \begin{cases} 1 \\ 0 \end{cases} \qquad (1)$$

The candidate path matrix R can be acquired not only for the host vehicle a but also per moving obstacle.

In S44, the ECU 10 uses the third path generation unit 17 to acquire an overlap matrix O that represents an overlap between the candidate paths. When the candidate path a of the host vehicle a and a candidate path β of a moving obstacle b are acquired, the two candidate paths α, β may have an overlap or may not have an overlap. When the candidate paths α, β do not have an overlap, the two moving obstacles do not have a possibility of colliding with each other. When the candidate paths α, β have an overlap, the two moving obstacles have a possibility of colliding with each other. A symmetric matrix (overlap matrix) $O_{a\alpha,b\beta}$ that represents the presence of an overlap can be acquired using General Formula (2).

$$O_{a\alpha,b\beta} = \begin{cases} 1 & \text{When there is overlap between two candidate paths } a, b \\ 0 & \text{Otherwise} \end{cases} \qquad (2)$$

While a set of the host vehicle and the moving obstacle is described here, the overlap matrix for the candidate paths can also be acquired for two moving obstacles. The same applies to various matrices described below.

In S46, the ECU 10 uses the third path generation unit 17 to acquire a collision possibility matrix H. The collision possibility matrix $H_{ab}$ of the host vehicle a and the moving obstacle b can be acquired using General Formula (3).

$$H_{ab} = \sum_{\alpha\beta} R_{a\alpha} O_{a\alpha,b\beta} R_{b\beta} \qquad (3)$$

It is considered that the possibility of collision can be zero when the host vehicle a and the moving obstacle b can select the candidate path $R_a$ such that the collision possibility matrix H becomes a zero matrix (H=0). Since each moving obstacle selects a path toward its destination, the candidate path matrix R that establishes H=0 cannot be selected at all times. When the candidate path matrix R that establishes H=0 cannot be selected, it is considered that each moving obstacle selects the candidate path matrix R such that the number of non-zero elements in the collision possibility matrix H is minimized. In such a case, the overlap between the candidate path a of the host vehicle a and the candidate path β of the moving obstacle b is not resolved. Thus, the possibility of collision may be determined by considering the movement speed of the moving obstacle, and collision may be avoided by temporally adjusting the host vehicle a (adjusting the speed profile). In the adjustment of the speed profile, it is considered that the speed profile is adjusted from the viewpoint that "since it is mostly desired that the moving obstacle travel ahead of the host vehicle, collision is easily avoided by allowing the moving obstacle to pass".

In S48, the ECU 10 uses the third path generation unit 17 to acquire a timing matrix T. Determination of the possibility of collision in the presence of an overlap between the candidate paths will be first described in a case where the overlap occurs at merely one point. A point where the candidate paths overlap each other is denoted by $n_{a\alpha,b\beta}$. The length from $x_a$ to $n_{a\alpha,b\beta}$ measured along the candidate path $p_{a\alpha}$ is denoted by $l(n_{a\alpha,b\beta},x_a)$. When the moving body is known, a time period $t_{a\alpha}$ needed for the host vehicle a to arrive at the point $n_{a\alpha,b\beta}$ can be estimated using General Formula (4).

$$t_{a\alpha} = \frac{l(n_{a\alpha,b\beta}, x_a)}{v_a} \qquad (4)$$

Similarly, a time period to needed for the moving obstacle b to arrive at the point $n_{a\alpha,b\beta}$ can be acquired. When the time period satisfies General Formula (5), the host vehicle a and the moving obstacle b come into contact with each other at the point $n_{a\alpha,b\beta}$. When the time period satisfies General Formula (6), the host vehicle a passes through the point $n_{a\alpha,b\beta}$ earlier than the moving obstacle b.

$$t_{a\alpha} = t_{b\beta} \qquad (5)$$

$$t_{a\alpha} < t_{b\beta} \qquad (6)$$

In such a case, the timing matrix T can be acquired as in General Formula (7).

$$T_{a\alpha,b\beta}(n_{a\alpha,b\beta}) = \begin{cases} \text{sgn}(t_{b\beta} - t_{a\alpha}), & O_{a\alpha,b\beta} = 1 \\ 0, & O_{a\alpha,b\beta} = 0 \end{cases} \qquad (7)$$

In S50, the ECU 10 uses the third path generation unit 17 to acquire a conflict tensor C. The timing matrix T represents which of the host vehicle a and the moving obstacle b passes through the focused point $n_{a\alpha,b\beta}$ earlier. Thus, the timing matrix T satisfies General Formula (8).

$$T(n_{a\alpha,b\beta}) = -{}^t T(n_{a\alpha,b\beta}) \qquad (8)$$

Considering that a predetermined difference δt in time is needed between the time at which the host vehicle a passes through the point $n_{a\alpha,b\beta}$, and the time at which the moving obstacle b passes through the point $n_{a\alpha,b\beta}$ in order for the host vehicle a and the moving obstacle b to safely move, correction is performed as in General Formula (9). Then, the timing matrix T has an antisymmetric element and a symmetric element.

$$T_{a\alpha,b\beta}(n_{a\alpha,b\beta}) = \begin{cases} \text{sgn}(t_{b\beta} - t_{a\alpha} - \delta t), & O_{a\alpha,b\beta} = 1 \\ 0, & O_{a\alpha,b\beta} = 0 \end{cases} \qquad (9)$$

In such a case, the conflict tensor (conflict matrix) C is acquired using General Formula (10).

$$C(n_{a\alpha,b\beta}) = \frac{1}{2}\{T(n_{a\alpha,b\beta}) + {}^t T(n_{a\alpha,b\beta})\} \qquad (10)$$

A non-zero element of the conflict tensor C that is a symmetric matrix represents a set of a moving obstacle and a plan between which the difference in time of passing through the point $n_{a\alpha,b\beta}$ is smaller than or equal to δt, that is, a set having a possibility of contact.

Next, the same can be applied to a case where the candidate paths overlap each other in a certain section. When two endpoints $n''_{a\alpha,b\beta}$, $n^f_{a\alpha,b\beta}$ in the section having an overlap are considered, the possibility of contact is represented by satisfaction of any of a first condition that the order of arrival of the host vehicle a and the moving obstacle b at one endpoint is different from the order at the other endpoint, and a second condition that $C(n_{a\alpha,b\beta})$ is equal to one at any endpoint. The endpoint that is far from the host vehicle a does not need to be a point where there is no overlap between the candidate paths, and may be set as the position of the host vehicle a after T seconds. The same applies to the moving obstacle b.

The first condition can be described as General Formula (11). Thus, a non-zero element of General Formula (12) represents the possibility of contact. In General Formula (12), "point" includes the endpoints of the section, and $[n''_{a\alpha,b\beta}, n^f_{a\alpha,b\beta}]$ represents a line segment.

$$C_{a\alpha,b\beta}([n^n_{a\alpha,b\beta}, n^f_{a\alpha,b\beta}]) = 1 = \frac{1}{2}|\text{sgn}(t^n_{b\beta} - t^n_{a\alpha}) + \text{sgn}(t^f_{b\beta} - t^f_{a\alpha})| \qquad (11)$$

$$C_{a\alpha,b\beta} = \sum_{point} C(n_{a\alpha,b\beta}) + \sum_{line} C([n^n_{a\alpha,b\beta}, n^f_{a\alpha,b\beta}]) \qquad (12)$$

When information $C_{a\alpha,b\beta}$ is acquired, the candidate path $p_{a\alpha}$ can be acquired from the map information. Consequently, quantities that should be acquired by observation or estimation are merely the position $x_a$ of the host vehicle or each moving obstacle and the speed $v_a$ of the host vehicle or each moving obstacle for a=1, 2, .... The difference δt in time is set by a design parameter that is set for avoiding collision. Other quantities are set by an estimation model or measurement by the sensor. While the speed $v_a$ of the host vehicle may be randomly assigned a different value per candidate path, the speed of another vehicle is assigned the measurement result or the value of the estimation model and thus, is not randomly assigned. Thus, the dependence of the host vehicle speed on the plan occurs for merely an element of the conflict tensor C that is related to the host vehicle. This is represented as a numerical expression in General Formula (13). In General Formula (13), a denotes the host vehicle.

$$C_{a\alpha,b\beta} = C_{a\alpha,b\beta}(x_a, v_{a\alpha}, x_b, v_b, \delta t) \qquad (13)$$

In S52, the ECU 10 uses the third path generation unit 17 to acquire an interference matrix D. The interference matrix D is acquired using General Formula (14) as a matrix that is acquired by substituting the overlap matrix O with the conflict tensor C from the viewpoint of an intention decision problem including collision avoidance by adjusting the speed of the host vehicle a.

$$D_{ab} = \sum_{\alpha\beta} R_{a\alpha} C_{a\alpha,b\beta} R_{b\beta} \qquad (14)$$

The intention decision problem including collision avoidance by adjusting the speed of the host vehicle a can be considered to be a problem that the host vehicle a and the moving obstacle b adjust the conflict tensor C by selecting the candidate path $R_{a\alpha}$ and the speed plan such that the interference matrix D represented by General Formula (14) becomes a zero matrix.

In S54, the ECU 10 uses the third path generation unit 17 to determine whether or not the interference matrix D for the host vehicle is a zero matrix. When the ECU 10 determines that the interference matrix D for the host vehicle is a zero matrix (S54: YES), the ECU 10 transitions to S68. When the ECU 10 determines that the interference matrix D for the host vehicle is not a zero matrix (S54: NO), the ECU 10 transitions to S56.

In S56, the ECU 10 uses the third path generation unit 17 to narrow down the candidate paths of the host vehicle. The third path generation unit 17 narrows down the candidate paths of the host vehicle by assuming that each moving obstacle follows a traffic rule that is set in advance. The traffic rule is stored in association with the position information on the map in Traffic Rule Map of the map database 4.

In the intention decision problem, it may not be appropriate to consider all possible behaviors of another moving obstacle. For example, considering the possibility that all oncoming vehicles on a road configured with two lanes of a traveling lane of the host vehicle and an opposing lane depart from their lane and appear in front of the host vehicle, the host vehicle may have to be stopped until there is no oncoming vehicle. Since the driver usually does not stop the host vehicle until there is no oncoming vehicle, an assumption is considered that driving performed by the driver in the actual environment is determined based on certain social compact (social expectation). Hereinafter, such a point will be separately considered at the intention decision level related to the candidate path matrix $R_a$ and the behavior decision level related to the conflict tensor C.

First, an assumption referred to as "path overlap avoidance assumption" will be illustrated as an intention decision principle. The value of an element of the interference matrix may be equal to 1 (there is a possibility of collision) when the paths of the host vehicle and the moving obstacle (or two moving obstacles) overlap each other. That is, the possibility of collision may be minimized when all moving obstacles select a plan that does not overlap the paths of another moving obstacle and the host vehicle. It is considered that for each moving obstacle, reasonable selection of a plan is selecting a plan that does not overlap the paths of another moving obstacle and the host vehicle, and maintaining the selected plan provided that the plan does not impede the movement of the moving obstacle toward the destination. Such selection of a plan by each moving obstacle will be referred to as "path overlap avoidance assumption".

When several types of the path overlap avoidance assumption are specifically described, a first assumption is that a plan such as traveling in the opposing lane that does not follow the traffic rule is not selected. A second assumption is that a plan that accompanies lane changes that are not needed is not selected. A third assumption is that when the destination of the moving obstacle is not known, the same number of plans as branches are considered at branches of a trajectory such as an intersection. For example, when the moving obstacle is another vehicle, it is considered that the destination of the moving obstacle is acquired by vehicle-to-vehicle communication and the like. The third path generation unit 17 narrows down the candidate paths of the host vehicle using a well-known method with the path overlap avoidance assumption.

In S58, the ECU 10 uses the third path generation unit 17 to acquire the interference matrix D again. In S60, the ECU 10 uses the third path generation unit 17 to determine again whether or not the interference matrix D for the host vehicle is a zero matrix. When the ECU 10 determines that the interference matrix D for the host vehicle is a zero matrix (S60: YES), the ECU 10 transitions to S68. When the ECU 10 determines that the interference matrix D for the host vehicle is not a zero matrix (S60: NO), the ECU 10 transitions to S62.

In S62, the ECU 10 uses the third path generation unit 17 to calculate the vehicle speed (speed profile) of the host vehicle for each non-zero element of the interference matrix using an altruistic strategy such that the non-zero element becomes zero. The altruistic strategy is illustrated as an order decision principle for causing the conflict tensor to become a zero matrix. When the element $C_{a\alpha,b\beta}$ of the conflict tensor is not zero, there is a possibility (possibility of contact) that the absolute value of the difference between the time of arrival of the host vehicle a at a point of a path overlap and the time of arrival of the moving obstacle b at the point is smaller than or equal to St. A condition for avoiding contact of the host vehicle a can be represented using General Formula (15).

$$|t_{a\alpha} - t_{b\beta}| > \delta t \qquad (15)$$

In such a case, General Formula (16) and General Formula (17) can be acquired using General Formula (4).

$$\frac{1(n_{a\alpha,b\beta}, x_a)}{v_a} - t_{b\beta} > \delta t \qquad (16)$$

$$-\frac{1(n_{a\alpha,b\beta}, x_a)}{v_a} + t_{b\beta} > \delta t \qquad (17)$$

A condition for allowing the moving obstacle b to pass can be described as General Formula (18) from General Formula (16) and General Formula (17). A condition for causing the host vehicle a to go first can be described as General Formula (19).

$$v_a < \frac{1(n_{a\alpha,b\beta}, x_a)}{t_{b\beta} + \delta t} \qquad (18)$$

$$\frac{1(n_{a\alpha,b\beta}, x_a)}{t_{b\beta} + \delta t} < v_a \qquad (19)$$

When collision is avoided by allowing the moving obstacle to pass the host vehicle, it is considered that the speed of the host vehicle is adjusted to satisfy General Formula (18). Avoidance of collision by allowing the moving obstacle to pass the host vehicle will be referred to as conflict resolution using altruistic strategy. When the host vehicle and merely one moving obstacle are present in the range of interaction, a stable traffic situation as a whole can be made by causing the host vehicle to pass ahead of the moving obstacle even when the moving obstacle is traveling at a speed above a speed limit. The same applies to a case where the moving obstacle passes ahead of the host vehicle. Thus, such an altruistic strategy is considered as a suggestion.

In S64, the ECU 10 uses the third path generation unit 17 to determine whether or not the host vehicle can have a vehicle speed (speed profile) at which the interference matrix D becomes a zero matrix. When the ECU 10 determines that the host vehicle cannot have a vehicle speed at which the interference matrix D becomes a zero matrix (S64: NO), the ECU 10 transitions to S66. When the ECU 10 determines that the host vehicle can have a vehicle speed at which the interference matrix D becomes a zero matrix (S64: YES), the ECU 10 transitions to S68.

In S66, the ECU 10 uses the HMI 5 to request the driver to intervene. The ECU 10 notifies the driver of a request for takeover (switching to manual driving from autonomous driving) by transmitting a control signal to the HMI 5.

When the driver is requested to intervene, it is considered that there are two or more moving obstacles in the range of interaction of the host vehicle. In such a case, even when the host vehicle a and the moving obstacle b are in a consistent state, the host vehicle a may want to give way to a third moving obstacle c, but the moving obstacle c may want to go first. In such a case, it is difficult for the moving obstacle c to set its state within the range of the altruistic strategy. Specifically, one example of such a scene is when the host vehicle a enters a priority road from a non-priority road while the other vehicle b that interferes with the host vehicle a is present in the priority road, and the other vehicle c having a low speed is present behind the host vehicle a. In such a case, opposition between intentions cannot be resolved by the altruistic strategy such that the host vehicle a gives way, and as a suggestion, it should be considered that the other vehicle c behind the host vehicle a is also expected to decelerate (correct the plan or reverse its intention to go first to an intention to give way) in order to observe the traffic rule and resolve the opposition between intentions.

A more complex case is an unstable state known as frustration in statistical physics. Such a state is when reversing the intention of the moving obstacle b needs reversing the intention of the host vehicle a in the above case. In such a case, a strategy of making any settlement such as reducing the interaction between the host vehicle a and the moving obstacles b, c is considered. In the case of autonomous driving, one method of reducing the interaction is increasing the effective distance between vehicles by decreasing the speed of the host vehicle a.

When there are two moving obstacles in addition to the host vehicle within the range of interaction, a dilemma may be present such that conflict as a whole cannot be surely resolved by merely the host vehicle. In such a case, it is considered that the driver is requested to intervene. When the host vehicle a is in a dilemma with the other moving obstacles b, c, General Formula (20) is established for any $(\alpha, v_{a\alpha})$. Thus, the dilemma can be detected from the conflict tensor C.

$$\left\{ \sum_\beta C_{a\alpha,b\beta} = 0, \sum_\gamma C_{a\alpha,c\gamma} \neq 0 \right\} \text{ or } \quad (20)$$

$$\left\{ \sum_\beta C_{a\alpha,b\beta} \neq 0, \sum_\gamma C_{a\alpha,c\gamma} = 0 \right\}$$

In S68, the ECU 10 uses the third path generation unit 17 to generate the remaining candidate path as the third path of the host vehicle. Then, the ECU 10 finishes the current process.

While the third path generation process is described thus far, the same parts as in the second path generation process may be employed in the second path generation process.

Entrance into Roundabout

An entrance of the host vehicle into a roundabout will be illustrated with respect to the third path generation process. The candidate path of the host vehicle a=1 includes a candidate path α=1 that enters a roundabout, and a candidate path α=2 that waits in front of the roundabout. When the other vehicle b (moving obstacle b) is traveling in the roundabout, the candidate path β of the other vehicle b includes a candidate path β=1 that exits from the roundabout, and a candidate path β=2 that remains in the roundabout.

There is an overlap between the candidate path α=1 of the host vehicle a and merely the candidate path β=2 of the other vehicle b that remains in the roundabout. The overlap matrix O can be described as General Formula (21) and General Formula (22).

$$O_{1a,2\beta} = \begin{pmatrix} O_{11,21} & O_{11,22} \\ O_{12,21} & O_{12,22} \end{pmatrix}_{\alpha\beta} \quad (21)$$

$$O_{1a,2\beta} = \begin{pmatrix} 0 & 1 \\ 0 & 0 \end{pmatrix}_{\alpha\beta} \quad (22)$$

The timing matrix T can be described as General Formula (23). The term $\tau_{12}$ in General Formula (23) is represented as General Formula (24), and the term $\tau_{21}$ in General Formula (23) is represented as General Formula (25). The subscript outside the parentheses is a representation that is introduced for convenience in order to clearly show the parameter in the parentheses.

$$T_{a\alpha,b\beta} = \begin{pmatrix} \begin{pmatrix} 0 & 0 \\ 0 & 0 \end{pmatrix}_{\alpha\beta} & \begin{pmatrix} 0 & \tau_{12} \\ 0 & 0 \end{pmatrix}_{\alpha\beta} \\ \begin{pmatrix} 0 & 0 \\ \tau_{21} & 0 \end{pmatrix}_{\alpha\beta} & \begin{pmatrix} 0 & 0 \\ 0 & 0 \end{pmatrix}_{\alpha\beta} \end{pmatrix} \quad (23)$$

$$\tau_{12} = \text{sgn}(t_{22} - t_{11} - \delta t) \quad (24)$$

$$\tau_{21} = \text{sgn}(t_{11} - t_{22} - \delta t) \quad (25)$$

A case where the candidate paths employed by the other vehicle b are not narrowed down, and the host vehicle a is assumed to enter the roundabout will be illustrated below. First, the fact that the candidate paths of the other vehicle b are not narrowed down is represented by General Formula (26). The entrance of the host vehicle a into the roundabout is represented by General Formula (27).

$$R_{2\beta} = (1,1)_\beta \quad (26)$$

$$R_{1\alpha} = (1,0)_\alpha \quad (27)$$

In such a case, the interference matrix D is represented in General Formula (28) to General Formula (30).

$$D_{ab} = \sum_{\alpha\beta} R_{a\alpha} C_{a\alpha,b\beta} R_{b\beta} \quad (28)$$

$$= \sum_{\alpha\beta} (1,0)_\alpha C_{a\alpha,b\beta} (1,1)_\beta \quad (29)$$

$$= \begin{pmatrix} 0 & \frac{1}{2}(\tau_{12} + \tau_{21}) \\ \frac{1}{2}(\tau_{12} + \tau_{21}) & 0 \end{pmatrix}_{ab} \quad (30)$$

In order to avoid contact between the host vehicle a and the other vehicle b, the speed profile of the host vehicle a should be adjusted such that the host vehicle a=1 has $\tau_{12}=0$ in order for the interference matrix D to become a zero matrix.

When all of the cases where the interference matrix D becomes a zero matrix in the passage through the roundabout are exemplified using the representations thus far, there are three cases (A) the host vehicle a takes the candidate path $R_{1\alpha}=(0,1)_\alpha$ that does not enter the roundabout, (B) the host vehicle a enters the roundabout, and the other vehicle b=2 is estimated to employ the candidate path $R_{2\beta}=(1,0)_\beta$, and (C) the host vehicle a enters the roundabout, and the speed profile of the host vehicle a is adjusted to establish c=0.

In the case (B), the interference matrix D is represented by General Formula (31) to General Formula (33), and the possibility of contact is equal to zero. Thus, the host vehicle a can immediately enter the roundabout.

$$D_{ab} = \sum_{\alpha\beta} R_{1\alpha} C_{a\alpha,b\beta} R_{2\beta} \quad (31)$$

$$= \sum_{\alpha\beta} (1,0)_\alpha C_{a\alpha,b\beta} (1,1)_\beta \quad (32)$$

$$= \begin{pmatrix} 0 & 0 \\ 0 & 0 \end{pmatrix}_{ab} \quad (33)$$

The candidate path β employed by the other vehicle b=2 in (B) that corresponds to a branch of the path in (C) is estimated before the speed profile is calculated in the case (C). Consequently, a function that makes an immediate entrance into the roundabout when the other vehicle b exits from the roundabout can be realized. A direction $h_b$ of the other vehicle (moving obstacle) b may be additionally introduced.

Time Shift Process

A time shift process will be described. The sensor of the autonomous driving system 100 measures the outside-vehicle environment. Consequently, a time delay Δt occurs until the actuator 6 starts to operate. Considering that the host vehicle starts to move after Δt from the time of measurement by the sensor, planning of the host vehicle is performed in a space where predictive correction corresponding to the time period Δt is made by shifting the position of the moving body outside the vehicle and the position $x_a$ of the host vehicle to $x_a + v_a \Delta t$.

Deferral of Determination

Deferral of determination will be described. When the scope of searching for the candidate path is D={p(τ)}, the candidate path can be defined as in General Formula (34) and General Formula (35) from the viewpoint of safety and traveling efficiency. In such a case, the state represented in General Formula (36) is achieved.

Safety-prioritized candidate path $\{p^s(\tau)\} = \arg_{S > \theta_s}\{S(p(\tau), E(s)) | D\}$ (34)

Efficiency-prioritized candidate path $\{p^e(\tau)\} = \arg_{S > \theta_e}\{E(p(\tau), E(s)) | D\}$ (35)

$\{p^s(\tau)\} \cap \{p^e(\tau)\}$ (36)

A safety evaluation function is denoted by S(p(t),E(s)), and a traveling efficiency evaluation function is denoted by E(p(τ),E(s)).

A smooth candidate path can be acquired by "switching to a candidate path prioritizing safety at time t+δt even when a candidate path prioritizing traveling efficiency is selected as the candidate path at time t".

A situation where a pedestrian is present in a roadside will be described as a specific example. In such a case, determination can be deferred as follows. (A) When strong braking is applied, the host vehicle can have sufficient time to stop even when the pedestrian enters the trajectory of the host vehicle for traveling. (B) When the host vehicle has sufficient time to stop, the host vehicle temporarily travels by prioritizing efficiency considering that "the pedestrian may not enter the trajectory of the host vehicle for traveling". (C) When the pedestrian disappears, the host vehicle maintains its traveling. (D) When there is still a possibility that "the pedestrian enters the trajectory of the host vehicle for traveling", a return is made to the determination (A).

Specifically, first, a final stop position with respect to the pedestrian is set. Next, a strong braking start position from which the host vehicle can stop at the final stop position using "strong braking" is acquired. A plan that prioritizes efficiency is employed to the strong braking start position from the current position (for example, the current speed is maintained).

Calculation of Reliability

Calculation of the reliability of the second path and the reliability of the third path by the reliability calculation unit 18 will be described. Reliability broadly includes the reliability of sensing of the host vehicle and the reliability of the result of signal processing that is performed based on the sensing result.

Reliability of Sensing of Host Vehicle

The reliability of sensing of the host vehicle is reliability calculated as the degree to which the external sensor 2 of the host vehicle detects the outside-vehicle environment, using "the known appearance of the outside-vehicle environment that is acquired using the external sensor 2 of the host vehicle". In the present embodiment, the reliability of sensing of the host vehicle means the reliability of sensing of autonomous driving.

The reliability calculation unit 18 calculates the reliability of sensing of autonomous driving by comparing the map information of the map database 4 with the detection result of the external sensor 2. When a prior-knowledge/map M(s,x) that is set as coordinates is used for recognition, it is considered that General Formula (37) that combines a signal s(t) of the external sensor 2 with the prior-knowledge/map M(s,x) is introduced.

$\hat{x}(t) = \arg_{min}\{d(s(t), s(x))\}$ (37)

A sensor signal that is expected to be acquired at the position x acquired from the prior-knowledge/map M(s,x) is denoted by s(x). Although it is not limited in particular, the position x preferably includes an azimuth h of the host vehicle when needed. The distance between sensor signals is denoted by d(•,•).

After the outside-vehicle environment is sensed, the host vehicle position is estimated (localized) in the autonomous driving system 100. The host vehicle position is estimated by the vehicle position recognition unit 11 comparing the detection result of the external sensor 2 with internal Localization Knowledge. In order to estimate the host vehicle position, the feature point stored in Localization Knowledge needs to be detected by the external sensor 2. The reliability calculation unit 18 calculates the reliability of sensing of autonomous driving using the ratio of detected feature points, a difference Δs(t,x) in sensing signal represented in General Formula (38), and the like.

$\Delta s(t, x) = s(t) - s(\hat{x}(t))$ (38)

The autonomous driving system 100 can evaluate the reliability of sensing of autonomous driving (acquired from the external sensor 2 or Localization Knowledge) by regarding the difference between the detection result in a structure recognition layer (the result of recognizing the structure of the outer world, that is, the outside-vehicle environment) and the prior-knowledge (structure recognition error) as abnormality. While the structure recognition error can be defined in various manners, it is considered that the structure recognition error is simply represented by General Formula (39) and General Formula (40) when a designed threshold is set as $\Delta \varepsilon_i(t) = |\varepsilon_i(t) - \varepsilon_j(\hat{x})|, \Delta \varepsilon.$ $\Delta S^2(t) = \sum_{i=1}^{N} \frac{1}{2N} \Delta \varepsilon_i(t)^2 \theta(\theta_\varepsilon - \Delta \varepsilon_i(t))$ (39)

$N_s(t) = \sum_{i=1}^{N} (1 - \theta(\theta_\varepsilon - \Delta \varepsilon_i(t)))$ (40)

The cumulative value of distance errors in reflection points having an error less than or equal to $\theta_\varepsilon$ is denoted by $\Delta S^2(t)$. The number of reflection points where the error exceeds $\theta_\varepsilon$ is denoted by $N_s(t)$. Both of $\Delta S^2(t)$ and $N_s(t)$ become zero when all feature points stored in Localization Knowledge completely match the feature points in the sensor signal. As the distance error is increased, that is, as the matching feature points are decreased, the values of $\Delta S^2(t)$ and $N_s(t)$ are increased. The two quantities can be combined to introduce a quantity of the estimated structure recognition error. The same can be applied to Traffic Light Location. Both of $\Delta S^2(t)$ and $N_s(t)$ are positioned in a self-monitoring function that uses the structure recognition layer.

The reliability of sensing of the host vehicle (the reliability of sensing of autonomous driving) described thus far is used in both calculation of the reliability of the second path and calculation of the reliability of the third path. For example, the reliability calculation unit 18 calculates the reliability of the second path and the reliability of the third path as a lower value as the reliability of sensing of the host vehicle is decreased.

Reliability of Result of Signal Processing Performed Based on Sensing Result

The autonomous driving system 100 is configured to not only perform tracking but also perform several estimations or predictions for the moving obstacle. Specifically, three estimations or predictions including estimation of the intention of the moving obstacle b seen from the host vehicle a and dynamic prediction and symbolic prediction of the moving obstacle b are considered.

The two predictions of the symbolic prediction and the dynamic prediction that are related to prediction of quantities such as the position of the moving obstacle describing the motion of the moving obstacle are classified for the reliability of prediction of the candidate path of the moving obstacle in the independent movement assumption. Hereinafter, prediction of the candidate path of the moving obstacle in the independent movement assumption will be referred to as independent moving obstacle prediction.

The intention estimation prediction that predicts the trajectory the moving obstacle will take is classified for the reliability of prediction of the candidate path of the moving obstacle in the interaction assumption. Hereinafter, prediction of the candidate path of the moving obstacle in the interaction assumption will be referred to as interactive moving obstacle prediction.

Reliability of Independent Moving Obstacle Prediction

The reliability of the independent moving obstacle prediction affects the reliability of the second path. In the estimation of the intention of the moving obstacle b seen from the host vehicle a, calculation of the reliability and self-monitoring can be performed using the reliability of the estimation result. In prediction of Xa of the moving obstacle b seen from the host vehicle a, calculation of the reliability and self-monitoring can be performed using a prediction error $\delta X_{ab}(t)$ represented in General Formula (41). An operator for predicting a state in the future after $\delta t$ is denoted by $\hat{T}(\delta t)$.

$$\delta X_{ab}(t)X_{ab}(t)-\hat{T}(\delta t)x_{ab}(t-\delta t) \quad (41)$$

More specifically, in calculation of the reliability and self-monitoring using the reliability, it is considered that the following quantities are used for each estimation or prediction. The symbolic prediction is prediction based on the result of recognizing whether each moving obstacle is a vehicle or a pedestrian. Thus, high prediction accuracy in such a layer means a state where "motions around the host vehicle are well seen". Basically, macro estimated quantities (the position x, the azimuth h, and the speed v) of the moving obstacle can be estimated under a model constraint condition M that targets "vehicle" or the like, that is, estimated by $\hat{T}(\delta t, M, x, h, v)$, and the prediction error $\delta X_{ab}(t)$ can be calculated.

The dynamic prediction is the most basic prediction and is considered not to be associated with the recognition level of a person such as "well reading". The macro estimated quantities (the position x, the azimuth h, and the speed v) of the moving obstacle can be calculated using a Kalman filter and a particle filter, that is, estimated by $\hat{T}(\delta t, h, v)$, and the prediction error $\delta X_{ab}(t)$ and likelihood can be calculated. The level of reliability of each of the symbolic prediction and the dynamic prediction is preferably evaluated, for example, using the magnitudes of the error and the likelihood.

For example, the reliability calculation unit 18 can calculate the reliability of the independent moving obstacle prediction based on the likelihood of the particle filter that predicts a change in the distribution of reflection points which are determined as reflection points from the moving obstacle by LIDAR. The reliability calculation unit 18 may use the likelihood of the particle filter as the reliability of the independent moving obstacle prediction. Alternatively, the reliability of the independent moving obstacle prediction may be calculated using a method that uses the error covariance matrix of the Kalman filter.

The reliability calculation unit 18 calculates the reliability of the second path (independent moving obstacle avoidance path) based on the reliability of the independent moving obstacle prediction and the reliability of sensing of the host vehicle. For example, the reliability calculation unit 18 calculates the reliability of the second path as a higher value as the reliability of the independent moving obstacle prediction is increased.

When prediction is performed using a model, the reliability of the model may be evaluated using the likelihood or a statistical quantity similar to the likelihood acquired at the identification of the moving obstacle. By using the variance of prediction of the future position acquired at the prediction of dynamic time evolution using the model, the reliability of the independent moving obstacle prediction may be decreased as the variance is increased.

Reliability of Interactive Moving Obstacle Prediction

The reliability of the interactive moving obstacle prediction affects the reliability of the third path. For example, interaction in the autonomous driving system 100 can be regarded as a change in behavior for avoiding collision between vehicles. More strictly, interaction is a change in behavior for reducing the possibility of collision between vehicles as much as possible. Generally, when the future behavior of the vehicle can be accurately estimated (when the reliability of prediction is high), the possibility of collision between vehicles can be easily decreased.

When the future behavior of the vehicle is not sufficiently known, it is considered that the reduction of the possibility of collision between vehicles is limited. A change in behavior for avoiding collision between vehicles in a traffic environment cannot be described by merely a physical law but by considering a model that describes the behavior of the moving body under an environment including the structure of the road and the traffic rule. Thus, a method of calculating the reliability needs to be based on the model. "Entrance into Roundabout" described above will be used as the model describing a change in behavior for avoiding collision between vehicles in a traffic environment.

The reliability of the interactive moving obstacle prediction is calculated in estimation where the interference matrix $D_{ab}$ is being acquired. Specifically, such estimation includes estimation of the positions of the host vehicle a and the moving obstacle b for calculating the conflict tensor C, estimation of the speed, and estimation of the candidate path matrix R by narrowing down the paths.

The conflict tensor C is represented in General Formula (42). The host vehicle is denoted by a.

$$C_{a\alpha,b\beta} = C_{a\alpha,b\beta}(x_a, v_{a\alpha}, x_b, v_b, \delta t) \tag{42}$$

The speed $v_b$ of the other vehicle b is a measured quantity. When a plurality of measurements is performed, a variance $\delta v_b$ of the speed $v_b$ can be calculated. For each possible candidate path $\beta$ of the other vehicle b, a time period $t_{b\beta}$ for reaching a point where the candidate path $\beta$ overlaps the candidate path of the host vehicle a is represented in General Formula (43) and General Formula (44).

$$t_{b\beta} + \delta t_{b\beta} = \frac{1(n_{a\alpha,b\beta}, x_{ab})}{v_b + \delta v_b} \tag{43}$$

$$\sim t_{b\beta} - \frac{1(n_{a\alpha,b\beta}, x_{ab})}{v_b} \delta v_b \tag{44}$$

Thus, a variance $1(n_{a\alpha,b\beta}, x_b)\sigma_{vb}/v_b$ of the time period $t_{b\beta}$ is acquired. A distribution p(t) of the difference in time between the host vehicle a that passes through the position $n_{a\alpha,b\beta}$ first, and the other vehicle b that passes through the position $n_{a\alpha,b\beta}$ is a distribution of the variance having its center at $(t_{b\beta} - t_{a\alpha})$.

A probability $P_{a\alpha,b\beta}$ that the difference in time of passing through the position $n_{a\alpha,b\beta}$ between the host vehicle a and the other vehicle b is less than or equal to $\delta t$ is represented in General Formula (45).

$$P_{a\alpha,b\beta} = \int_{-\infty}^{\delta t} \rho(t) dt \tag{45}$$

The possibility of contact can be estimated as in General Formula (46) by comparing the probability with a threshold $\theta_c$.

$$C_{a\alpha,b\beta} = \begin{cases} 0 & P_{a\alpha,b\beta} \leq \theta_c \\ 1 & \text{otherwise} \end{cases} \tag{46}$$

One of preferable indexes indicating the reliability of estimation of the possibility of contact is Index (47) that is the ratio of the threshold $\theta_c$ to the probability $P_{a\alpha,b\beta}$.

$$\frac{\theta_c}{P_{a\alpha,b\beta}} \tag{47}$$

When the speed of the other vehicle b is not measured, it is considered that $v_b$ is substituted with a legal speed (a legal speed corresponding to the position of the host vehicle a on the map). In such a case, the reliability of $C_{a\alpha,b\beta}$ is preferably substituted, for example, with low reliability that is set in advance. The reliability of $C_{a\alpha,b\beta}$ is one example of the reliability of the interactive moving obstacle prediction. Alternatively, an offset quantity from a separation plane in a support vector machine is considered as one example.

The reliability calculation unit 18 calculates the reliability of the third path (interactive moving obstacle avoidance path) based on the reliability of the interactive moving obstacle prediction and the reliability of sensing of the host vehicle. For example, the reliability calculation unit 18 calculates the reliability of the third path as a higher value as the reliability of the interactive moving obstacle prediction is increased.

Reliability of Candidate Path Matrix

Information that is needed for acquiring the candidate path matrix using the path overlap avoidance assumption is merely the position of the moving obstacle. When the candidate path includes a branch point of the path such as an intersection, a plurality of candidate paths is assigned 1 in the candidate path matrix that is acquired using the path overlap avoidance assumption. One example is the discussion about the roundabout. The candidate path matrix R can be narrowed down as in General Formula (48).

$$R_{2\beta} = (11)_\beta \rightarrow R_{2\beta} = (10)_\beta \tag{48}$$

That is, the candidate path matrix having two possibilities from estimation based on the path overlap avoidance assumption is narrowed down to a candidate path matrix having one possibility by observing the moving obstacle in detail. By narrowing down the candidate path, the autonomous driving vehicle can travel efficiently.

The candidate path matrix has a relationship in General Formula (49) from its definition.

$$\sum_{\beta} R_{b\beta} \geq 1 \tag{49}$$

As the value of the relationship is decreased, the intention (selected path) of the moving obstacle b is well read.

In the actual environment, interaction between the moving obstacle b and the host vehicle a needs to be considered near the branch point in order to read the intention of the moving obstacle b about selecting a candidate path branching off from the branch point. A probability $\rho(a,b,\beta)$ of the moving obstacle b selecting the candidate path $\beta$ needs not only macro measured values of the moving obstacle b but also macro measured values of the host vehicle a. The macro measured values are representatively a distance d to the branch point from the position of the moving obstacle b, the speed v of the moving obstacle b, and the direction h of the vehicle body of the moving obstacle b. That is, the probability $\rho(a,b,\beta)$ of the moving obstacle b selecting the path $\beta$ seen from the host vehicle a is represented in General Formula (50).

$$\rho(a,b,\beta) = \rho(a,b,\beta: d_a, v_a, h_a, d_b, v_b, h_b) \tag{50}$$

The probability function can be more accurately reproduced when a sufficient amount of data near the branch point is provided. A process represented in General Formula (51) is performed by acquiring the probability function and comparing the probability function with the threshold $\theta$.

$$R_{b\beta} = \begin{cases} 0 & \rho(a, b, \beta: d_a, v_a, h_a, d_b, v_b, h_b) \leq \theta \\ 1 & \text{otherwise} \end{cases} \tag{51}$$

By performing such a process, the intention (selected path) of the moving obstacle b seen from the host vehicle a can be narrowed down. General Formula (52) that is the ratio of the threshold $\theta$ to the probability $\rho(a,b,\beta: d_a, v_a, h_a, d_b, v_b, h_b)$ is one preferable example of the narrowed reliability.

$$\frac{\theta}{\rho(a, b, \beta: d_a, v_a, h_a, d_b, v_b, h_b)} \tag{52}$$

Such a function can be realized using a support vector machine or the like when data including the distance d to the branch point from the position of the moving obstacle b, the speed v of the moving obstacle b, and the direction h of the vehicle body of the moving obstacle b is provided. When a support vector machine is used, the ratio of the distance to an identification plane of the support vector machine from a data point, to the machine size of the support vector machine is preferably used as the reliability of narrowing down of the intention (selected path) of the moving obstacle b seen from the host vehicle a. The illustrated moving obstacle b is any moving obstacle, and the described content can be applied to various moving obstacles.

While the method of acquiring reliability is illustrated by using the probability threshold process for the conflict tensor, and using the probability threshold process and the support vector machine for narrowing down the candidate path matrix, the present disclosure is not limited thereto, and reliability may be acquired using other appropriate methods.

The threshold θ can be used as an index of reliability. Specifically, when a relatively large value can be given to the threshold θ as a temporary value, the possibility of determining that there is a possibility of collision in calculation of the conflict tensor is decreased, and the candidate paths are smoothly narrowed down. Thus, the intention decision and the behavior decision are relatively loosely performed from the viewpoint of avoiding collision. That is, efficient path selection is performed in the host vehicle. Even in the case of the path selection, the behavior of another vehicle immediately before the threshold process is probabilistically estimated in the same manner. Thus, the lowest reliability that appears during calculation is easily assigned as the reliability of the path selection. Thus, when the reliability is sufficiently higher than the original reliability, and the relatively loose intention decision and behavior decision are selected, it can be considered that the autonomous driving system 100 can perform appropriate and efficient autonomous traveling. When the reliability is not sufficiently higher than the original reliability, the autonomous driving system 100 does not narrow down the candidate paths of another moving obstacle, and selects relatively strict intention decision and behavior decision from the viewpoint of avoiding collision based on the independent moving obstacle prediction that assumes a plurality of candidate paths. Accordingly, the autonomous driving system 100 can perform autonomous traveling having higher reliability.

Process of Narrowing Down Candidate Path Matrix

Figure 4:
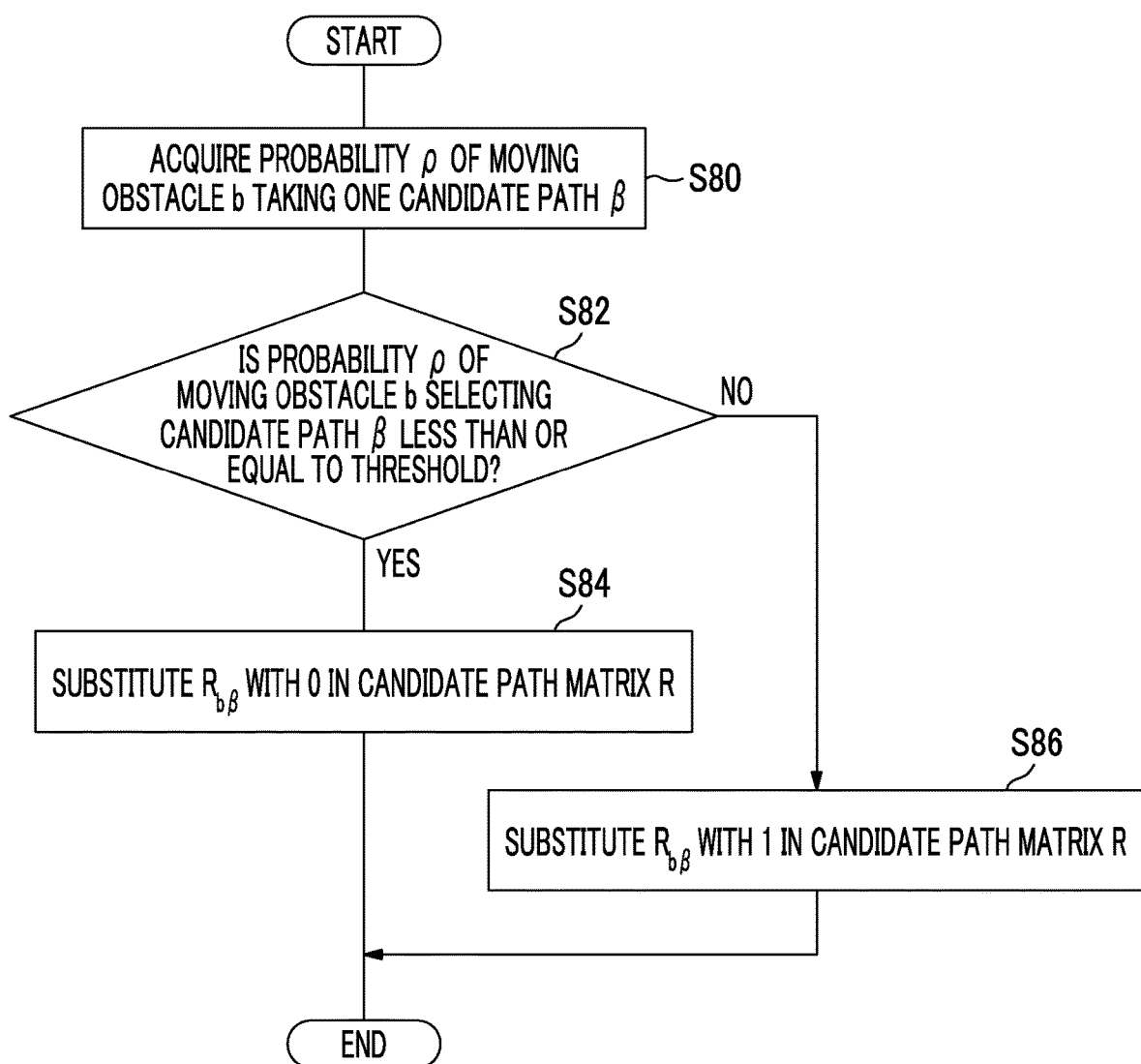
FIG. 4 is a flowchart illustrating a candidate path selection process.

FIG. 4 is a flowchart illustrating a process of narrowing down the candidate path matrix. The moving obstacle b will be described as a target for path estimation.

As illustrated in FIG. 4, in S80, the ECU 10 uses the third path generation unit 17 to acquire the probability p of the moving obstacle b taking one candidate path p. The method of acquiring the probability p is described above.

In S82, the ECU 10 uses the third path generation unit 17 to determine whether or not the probability p of the moving obstacle b selecting the candidate path β is less than or equal to a threshold. The threshold is a value that is set in advance. When the ECU 10 determines that the probability p of the moving obstacle b selecting the candidate path β is less than or equal to the threshold (S82: YES), the ECU 10 transitions to S84. When the ECU 10 determines that the probability p of the moving obstacle b selecting the candidate path β is not less than or equal to the threshold (S82: NO), the ECU 10 transitions to S86.

In S84, the ECU 10 uses the third path generation unit 17 to substitute $R_{b\beta}$ with zero in the candidate path matrix R. Then, the ECU 10 finishes the current process. In S86, the ECU 10 uses the third path generation unit 17 to substitute $R_{b\beta}$ with one in the candidate path matrix R. Then, the ECU 10 finishes the current process.

Detection of Moving Obstacle Having Significant Influence

Hereinafter, detection of a moving obstacle having a relatively significant influence in path generation will be considered. A large number of moving obstacles are observed by the autonomous driving system 100. When autonomous driving is performed, the prediction error tends to be increased as the moving obstacle is far from the host vehicle. Thus, although it is not particularly limited, it is preferable not to reflect the presence of the far moving obstacle in control of the autonomous driving system 100. In order to realize a practical autonomous driving system 100, it is desirable to establish a method of selecting a moving obstacle having a relatively significant influence from the large number of moving obstacles.

A reconfigured outside-vehicle environment E(s) is mathematically represented in General Formula (53).

$$p^*(\tau,\hat{h}) = \arg_{min}\{\text{Cost}(p(\tau,\hat{h}),E(s))\} \qquad (53)$$

In General Formula (53), p(τ) denotes a candidate path, and E(s) denotes the outside-vehicle environment that is reconfigured in a four-dimensional time space from the sensor signal s. The estimated value of the attitude (direction) of the host vehicle is denoted by ĥ.

When the host vehicle is denoted by a, and an environment (E(s)⊕b(s)) acquired by removing a moving obstacle Ob(s) from the outside-vehicle environment E(s) is considered, a candidate path for the environment is acquired as in General Formula (54).

$$p_a^{\ominus b}(\tau) \arg_{min}\{\text{Cost}(p_a(\tau),E(s) \oplus Ob(s))\} \qquad (54)$$

When General Formula (55) is satisfied, the output of the autonomous driving system 100 is not changed even when the moving obstacle Ob(s) is considered not to exist. Thus, the influence of the moving obstacle Ob(s) on the autonomous driving system 100 may be considered relatively low.

$$p_a^{\ominus b}(\tau) \sim p^*_a(\tau) \qquad (55)$$

The difference between two candidate paths is evaluated using General Formula (56). Furthermore, General Formula (57) is considered.

$$d(p_a^{\ominus b}(\tau), p_a^*(\tau)) = d\tau |p_a^{\ominus b}(\tau) - p_a^*(\tau)|^2 \qquad (56)$$

$$F_a = \sum_b d(p_a^{\ominus b}(\tau), p_a^*(\tau)) \qquad (57)$$

General Formula (56) and General Formula (57) are referred to as the degree of environmental dependence of the autonomous driving system.

When the number of moving obstacles is denoted by n, the variance of the difference in candidate path is defined as in General Formula (58), and General Formula (59) is defined as a relative influence degree that indicates the relative value of the influence of the moving obstacle b on the host vehicle a.

$$\sigma_{da}^2 = \frac{1}{n}\sum_b d\left(p_a^{\ominus b}(\tau) - p_a^*(\tau) - \frac{1}{n}F_a\right)^2 \qquad (58)$$

-continued $$F_{ab}^N = \frac{d(p_a^{\ominus b}(\tau) - p_a^*(\tau))}{F_a} \quad (59)$$

Such a quantity is a quantity that is acquired using the presence of the moving obstacle. Such a quantity has a low possibility that $p^*_a(\tau)$ is significantly changed when one object for which segmentation/tracking performance is low is divided into two. Therefore, the autonomous driving system 100 can be expected to acquire a stable result.

For example, it is considered that the degree of difficulty that the autonomous driving system 100 has in reading the outside-vehicle environment is estimated as in General Formula (60) using a relative influence degree $F_{ab}^N$ described below.

$$U_a(t) = \sum_b |\delta X_b(t)| \cdot F_{ab}^N \quad (60)$$

It is considered that a moving obstacle $\alpha_a$ to which the host vehicle a should be alerted first is acquired using General Formula (61).

$$\alpha_a(t) = \arg\max_{max} \{|\delta X_b(t)| \cdot F_{ab}^N\} \quad (61)$$

Effect of Autonomous Driving System (Trajectory Setting Device)

The autonomous driving system 100 (trajectory setting device 101) according to the present embodiment described thus far generates the first path of the host vehicle when all obstacles are assumed to be stationary obstacles, the second path of the host vehicle when the moving obstacle is assumed to move independently, and the third path of the host vehicle when the moving obstacle is assumed to move while interacting with at least one of the other obstacles or the host vehicle. The autonomous driving system 100 calculates the reliability of the second path and the reliability of the third path, and sets the trajectory of the host vehicle for traveling from the first path, the second path, and the third path based on the reliability of the second path and the reliability of the third path. Thus, the autonomous driving system 100 can appropriately set the trajectory of the host vehicle for traveling from paths that are generated using a plurality of different methods.

In the autonomous driving system 100, when the reliability of the third path is higher than or equal to the third reliability threshold, the trajectory setting unit 19 sets the trajectory of the host vehicle for traveling from the third path. When the reliability of the third path is lower than the third reliability threshold, and the reliability of the second path is higher than or equal to the second reliability threshold, the trajectory setting unit 19 sets the trajectory of the host vehicle for traveling from the second path. When the reliability of the third path is lower than the third reliability threshold, and the reliability of the second path is lower than the second reliability threshold, the trajectory setting unit 19 sets the trajectory of the host vehicle for traveling from the first path. Accordingly, when reliability is sufficiently high in the autonomous driving system 100, the trajectory of the host vehicle for traveling in the order of the third path and the second path can be employed. When the reliability of the second path and the reliability of the third path are not sufficiently high in the autonomous driving system 100, the trajectory of the host vehicle for traveling is set from the first path. Thus, a situation where the trajectory of the host vehicle for traveling cannot be set due to the insufficient reliability of the second path and the insufficient reliability of the third path is suppressed.

In the autonomous driving system 100, the reliability calculation unit 18 calculates the reliability of the second path based on the reliability of sensing of the host vehicle and the reliability of prediction of the candidate path of the moving obstacle in a case where the moving obstacle is assumed to move independently. Thus, the reliability calculation unit 18 can acquire the reliability of the second path more appropriately than when the reliability of the second path is calculated from merely one of the reliability of sensing of the host vehicle or the reliability of prediction of the candidate path of the independent moving obstacle.

Similarly, in the autonomous driving system 100, the reliability calculation unit 18 calculates the reliability of the third path based on the reliability of sensing of the host vehicle and the reliability of prediction of the candidate path of the moving obstacle in a case where the moving obstacle is assumed to move while interacting with at least one of the other obstacles or the host vehicle. Thus, the reliability calculation unit 18 can acquire the reliability of the third path more appropriately than when the reliability of the third path is calculated from merely one of the reliability of sensing of the host vehicle or the reliability of prediction of the candidate path of the interactive moving obstacle.

While an exemplary embodiment of the present disclosure is described thus far, the present disclosure is not limited to the embodiment. The present disclosure can be embodied in various forms that are achieved by carrying out various changes and improvements to the embodiment based on the knowledge of those skilled in the art.

While the present embodiment describes the trajectory setting device 101 as constituting a part of the autonomous driving system 100, the trajectory setting device 101 does not need to constitute a part of the autonomous driving system. The trajectory setting device 101 may constitute a part of a driving assistance system that assists a driving operation of the driver. The trajectory setting device 101 may be used in generation of a trajectory for guiding the driver in a navigation system. That is, the method of using the trajectory generated by the trajectory setting device 101 is not particularly limited.

When the obstacle recognition unit 12 recognizes a plurality of obstacles, the third path generation unit 17 may generate a comparative candidate path for each candidate path generated as the third path. The comparative candidate path is a candidate path when one of the obstacles is assumed not to exist. In such a case, the trajectory setting unit 19 prohibits the trajectory of the host vehicle for traveling from being set as a candidate path of which the degree of lateral separation from the comparative candidate path is less than or equal to a separation degree threshold among the candidate paths generated as the third path. When a candidate path is significantly laterally changed in a case where one obstacle is assumed not to exist, generation of the candidate path is assumed to be unstable. Thus, the trajectory setting unit 19 prohibits the trajectory of the host vehicle for traveling from being set as the candidate path.

The degree of lateral separation between the candidate path and the comparative candidate path can be set as the longest lateral distance by comparing the lateral distance between the candidate path and the comparative candidate path (distance in the width direction of the traveling lane) for each longitudinal position in the traveling lane. The degree of lateral separation may be the integral value of the lateral distance in a certain number of longitudinal positions in front of the host vehicle. The separation degree threshold is a value that is set in advance.

Calculation of the reliability by the reliability calculation unit 18 is not limited to the content described above. The reliability calculation unit 18 may calculate the reliability of the second path or the reliability of the third path from merely the reliability of sensing of the host vehicle. The reliability calculation unit 18 may not calculate the reliability of sensing of the host vehicle. The reliability calculation unit 18 may calculate the reliability of the second path from merely the reliability of the independent moving obstacle prediction, and may calculate the reliability of the third path from merely the reliability of the interactive moving obstacle prediction.

The reliability calculation unit 18 may calculate the reliability of the first path based on the reliability of sensing of the host vehicle. For example, when the reliability of the second path is lower than the second reliability threshold, and the reliability of the third path is also lower than the third reliability threshold, the trajectory setting unit 19 may request the driver to intervene when the reliability of the first path is lower than a first reliability threshold. The first reliability threshold is a value that is set in advance.

The trajectory setting device 101 may not generate the first path. That is, the trajectory setting device 101 may not include the first path generation unit 15 and include the second path generation unit 16 and the third path generation unit 17. In such a case, the trajectory setting device 101 generates the second path of the host vehicle when the moving obstacle is assumed to move independently, and generates the third path of the host vehicle when the moving obstacle is assumed to move while interacting with at least one of the other obstacles or the host vehicle. The trajectory setting device 101 calculates the reliability of the second path and the reliability of the third path, and sets the trajectory of the host vehicle for traveling from the second path and the third path based on the reliability of the second path and the reliability of the third path. Thus, the trajectory setting device 101 can appropriately set the trajectory of the host vehicle for traveling from paths that are generated using a plurality of different methods.

In such a case, when the reliability of the second path is lower than the second reliability threshold, and the reliability of the third path is also lower than the third reliability threshold, the trajectory setting device 101 may request the driver to intervene.

What is claimed is:

1. A trajectory setting device that sets a trajectory of a host vehicle for traveling, the trajectory setting device comprising an electronic control unit (ECU) configured to:
   recognize obstacles around the host vehicle;
   generate a first path of the host vehicle by assuming all of the obstacles to be stationary obstacles;
   detect a moving obstacle from the obstacles;
   generate a second path of the host vehicle when the moving obstacle is assumed to move independently;
   generate a third path of the host vehicle when the moving obstacle is assumed to move while interacting with at least one of the other obstacles or the host vehicle;
   calculate reliability of the second path and reliability of the third path; and
   set the trajectory of the host vehicle for traveling from the first path, the second path, and the third path based on the reliability of the second path and the reliability of the third path.

2. The trajectory setting device according to claim 1, wherein:
   when the reliability of the third path is higher than or equal to a third reliability threshold, the ECU is configured to set the trajectory of the host vehicle for traveling from the third path;
   when the reliability of the third path is lower than the third reliability threshold, and the reliability of the second path is higher than or equal to a second reliability threshold, the ECU is configured to set the trajectory of the host vehicle for traveling from the second path; and
   when the reliability of the third path is lower than the third reliability threshold, and the reliability of the second path is lower than the second reliability threshold, the ECU is configured to set the trajectory of the host vehicle for traveling from the first path.

3. The trajectory setting device according to claim 1, wherein the ECU is configured to calculate the reliability of the second path based on reliability of sensing of the host vehicle and reliability of prediction of a candidate path of the moving obstacle when the moving obstacle is assumed to move independently.

4. The trajectory setting device according to claim 1, wherein the ECU is configured to calculate the reliability of the third path based on reliability of sensing of the host vehicle and reliability of prediction of a candidate path of the moving obstacle when the moving obstacle is assumed to move while interacting with at least one of the other obstacles or the host vehicle.

5. A trajectory setting device that sets a trajectory of a host vehicle for traveling, the trajectory setting device comprising an electronic control unit (ECU) configured to:
   recognize obstacles around the host vehicle;
   detect a moving obstacle from the obstacles;
   generate a second path of the host vehicle when the moving obstacle is assumed to move independently;
   generate a third path of the host vehicle when the moving obstacle is assumed to move while interacting with at least one of the other obstacles or the host vehicle;
   calculate reliability of the second path and reliability of the third path; and
   set the trajectory of the host vehicle for traveling from the second path and the third path based on the reliability of the second path and the reliability of the third path.

6. A trajectory setting method of setting a trajectory of a host vehicle to avoid obstacles, the trajectory setting method comprising:
   generating a first path of the host vehicle by assuming all obstacles around the host vehicle to be stationary obstacles;
   generating a second path of the host vehicle when a moving obstacle detected from the obstacles is assumed to move independently;
   generating a third path of the host vehicle when the moving obstacle is assumed to move while interacting with at least one of the other obstacles or the host vehicle;
   calculating reliability of the second path and reliability of the third path; and
   setting the trajectory of the host vehicle from the first path, the second path, and the third path based on the reliability of the second path and the reliability of the third path.

7. The trajectory setting method according to claim 6, wherein:
   in the setting of the trajectory, when the reliability of the third path is higher than or equal to a third reliability threshold, the trajectory of the host vehicle for traveling is set from the third path;

in the setting of the trajectory, when the reliability of the third path is lower than the third reliability threshold, and the reliability of the second path is higher than or equal to a second reliability threshold, the trajectory of the host vehicle for traveling is set from the second path; and in the setting of the trajectory, when the reliability of the third path is lower than the third reliability threshold, and the reliability of the second path is lower than the second reliability threshold, the trajectory of the host vehicle for traveling is set from the first path.

8. The trajectory setting method according to claim 6, wherein in the calculating of the reliability, the reliability of the second path is calculated based on reliability of sensing of the host vehicle and reliability of prediction of a candidate path of the moving obstacle when the moving obstacle is assumed to move independently.

9. The trajectory setting method according to claim 6, wherein in the calculating of the reliability, the reliability of the third path is calculated based on reliability of sensing of the host vehicle and reliability of prediction of a candidate path of the moving obstacle when the moving obstacle is assumed to move while interacting with at least one of the other obstacles or the host vehicle.

10. A trajectory setting system comprising:
an actuator configured to control a host vehicle; and
an electronic control unit (ECU) programmed to:
  recognize obstacles around the host vehicle,
  generate a first path of the host vehicle by assuming all of the obstacles to be stationary obstacles,
  detect a moving obstacle from the obstacles,
  generate a second path of the host vehicle when the moving obstacle is assumed to move independently,
  generate a third path of the host vehicle when the moving obstacle is assumed to move while interacting with at least one of the other obstacles or the host vehicle,
  calculate reliability of the second path and reliability of the third path,
  set a trajectory of the host vehicle for traveling from the first path, the second path, and the third path based on the reliability of the second path and the reliability of the third path, and
  control the actuator based on the trajectory of the host vehicle for traveling.

11. A trajectory setting system comprising:
an actuator configured to control a host vehicle; and
an electronic control unit (ECU) programmed to:
  recognize obstacles around the host vehicle,
  detect a moving obstacle from the obstacles,
  generate a second path of the host vehicle when the moving obstacle is assumed to move independently,
  generate a third path of the host vehicle when the moving obstacle is assumed to move while interacting with at least one of the other obstacles or the host vehicle,
  calculate reliability of the second path and reliability of the third path,
  set a trajectory of the host vehicle for traveling from the second path and the third path based on the reliability of the second path and the reliability of the third path, and
  control the actuator based on the trajectory of the host vehicle for traveling.

\* \* \* \* \*